United States Patent
Baek et al.

(10) Patent No.: US 10,338,423 B2
(45) Date of Patent: Jul. 2, 2019

(54) DISPLAY DEVICE

(71) Applicant: LG ELECTRONICS INC., Seoul (KR)

(72) Inventors: Sangmin Baek, Seoul (KR); Jaeyong Yoo, Seoul (KR); Uihyung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/832,630

(22) Filed: Dec. 5, 2017

(65) Prior Publication Data

US 2019/0018274 A1 Jan. 17, 2019

(30) Foreign Application Priority Data

Jul. 13, 2017 (KR) .......................... 10-2017-0089144

(51) Int. Cl.
*G02F 1/1333* (2006.01)
*F21V 8/00* (2006.01)
*G02F 1/1335* (2006.01)

(52) U.S. Cl.
CPC ....... *G02F 1/133308* (2013.01); *G02B 6/002* (2013.01); *G02B 6/0043* (2013.01); *G02B 6/0055* (2013.01); *G02B 6/0088* (2013.01); *G02F 1/133524* (2013.01); *G02F 1/133504* (2013.01); *G02F 2001/133317* (2013.01); *G02F 2201/46* (2013.01); *G02F 2202/28* (2013.01)

(58) Field of Classification Search
CPC .... G02B 6/0088; G02B 6/002; G02B 6/0043; G02B 6/0055; G02F 1/133308
See application file for complete search history.

(56) References Cited

U.S. PATENT DOCUMENTS

2018/0017827 A1* 1/2018 Kil .................. G02B 6/0088

FOREIGN PATENT DOCUMENTS

WO 2013140464 9/2013

OTHER PUBLICATIONS

European Patent Office Application Serial No. 18154846.2, Search Report dated Jul. 2, 2018, 9 pages.

* cited by examiner

*Primary Examiner* — Daniel A Hess
(74) *Attorney, Agent, or Firm* — Lee, Hong, Degerman, Kang & Waimey PC

(57) ABSTRACT

A display device is disclosed. The display device comprises: a display panel; an optical layer positioned at a rear of the display panel, the optical layer providing the display panel with light; a side frame including: a side frame body covering an edge of the optical layer; and a side frame extension extended from the side frame body, the side frame extension positioned between the optical layer and the display panel; and a light guide module positioned between the display panel and the side frame extension, the light guide module elongated along the edge of the optical layer, wherein a gap is formed between the light guide module and the display panel.

21 Claims, 32 Drawing Sheets

DISPLAY DEVICE

Pursuant to 35 U.S.C. § 119(a), this application claims the benefit of earlier filing date and right of priority to Korean Patent Application No. 10-2017-0089144, filed on Jul. 13, 2017, the contents of which are hereby incorporated by reference herein in its entirety.

BACKGROUND OF THE INVENTION

Field of the Invention

The present invention is related to a display device.

Discussion of the Related Art

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

As the bezel of a display device becomes slimmer, researches on a display device that uniformly supplies light to the display panel have been conducted.

SUMMARY OF THE INVENTION

Accordingly, an object of the present disclosure is to address the above-described and other problems.

Another object of the present disclosure is to provide a display device comprising a slim bezel.

Another object of the present disclosure is to provide rigidity to the display device comprising a slim bezel.

Another object of the present disclosure is to provide uniform light to the display panel belonged to the display device.

According to an aspect of the present invention, there is provided a display device comprising: a display panel; an optical layer positioned at a rear of the display panel, the optical layer providing the display panel with light; a side frame including: a side frame body covering an edge of the optical layer; and a side frame extension extended from the side frame body, the side frame extension positioned between the optical layer and the display panel; and a light guide module positioned between the display panel and the side frame extension, the light guide module elongated along the edge of the optical layer, wherein a gap is formed between the light guide module and the display panel.

According to another aspect of the present invention, the light guide module may include: a first body facing the side frame extension, the first body coupled to the side frame extension; and a second body extended toward the display panel from the first body, the second body coupled to the display panel, and the gap may include a first gap positioned between the first body and the display panel.

According to another aspect of the present invention, the light guide module may include a wing portion extended toward opposite side of the edge of the display panel from the first body, and the wing portion may have a wedge shape narrowing toward the opposite side of the edge of the display panel.

According to another aspect of the present invention, the wing portion may include: an incident surface facing the optical layer, the incident surface receiving the light from the optical layer; and a guide surface bent and extended from the incident surface, the guide surface facing the display panel obliquely.

According to another aspect of the present invention, the first body may include: a first body rear surface extended from the incident surface, the first body rear surface facing the side frame extension; and a first body front surface extended from the guide surface, the first body front surface facing the display pane, and the first gap may be positioned between the display panel and the first body front surface.

According to another aspect of the present invention, the first body front surface may be alongside of the display panel, and the guide surface may be bent and extended toward the optical layer from the first body front surface.

According to another aspect of the present invention, the first body front surface may be inclined with respect to the display panel in a direction from the second body to the wing portion.

According to another aspect of the present invention, the incident surface may be bent and extended toward the optical layer from the first body rear surface.

According to another aspect of the present invention, the incident surface may be bent and extended toward the display panel from the first body rear surface.

According to another aspect of the present invention, the light guide module may comprise: a body including: a body rear surface facing the side frame extension, the body surface coupled to the side frame extension; and a second front surface facing the display panel, the second front surface coupled to the display panel; and a wing portion extended toward opposite side of the edge of the display panel, and the wing portion may have a wedge shape narrowing toward the opposite side of the edge of the display panel.

According to another aspect of the present invention, the body may include a body front surface bent and extended toward a rear of the body from the second front surface, the body front surface leading to the wing portion, and the gap may include a first gap positioned between the body surface and the display panel.

According to another aspect of the present invention, the wing portion may include: a guide surface extended from the body surface, the guide surface inclined with respect to the display panel; and an incident surface extended from the body rear surface, the incident surface leading to the guide surface.

According to another aspect of the present invention, the incident surface may be bent and extended toward the optical layer from the body rear surface.

According to another aspect of the present invention, the incident surface may be bent and extended toward the display panel from the body rear surface.

According to another aspect of the present invention, the light guide module may include: a back surface facing the side frame extension; and a scattering pattern formed on the back surface, the scattering pattern dispersing the light.

According to another aspect of the present invention, the light guide module may include: an outer surface exposed to an outside of the display device; a reflective layer formed on the outer surface, the reflective layer reflecting the light; and a shielding layer formed on the reflective layer, the shielding layer containing a light absorbing material which absorb the light.

According to another aspect of the present invention, the optical layer may form a first edge and a second edge opposite to the first edge, the side frame may include: a first side frame covering the first edge; and a second side frame covering the second edge, and the light guide module may include: a first light guide module positioned between the first side frame and the display panel; and a second light guide module positioned between the second side frame and the display panel.

According to another aspect of the present invention, the optical layer may form a third edge extending from an end of the first edge to an end of the second edge, the side frame may include a third side frame covering the third edge, and the light guide module may include a third light guide module located between the third side frame and the display panel.

According to another aspect of the present invention, the display device may further comprise an adhesive positioned between the light guide module and the side frame extension, and the adhesive pad may couple the light guide module with the side frame extension.

According to another aspect of the present invention, the light guide module may be coupled to the display panel through UV bonding.

According to at least one of embodiments of the present invention, the display device comprising the slim bezel may be provided.

According to at least one of embodiments of the present invention, the rigidity may be provided to the display device comprising the slim bezel.

According to at least one of embodiments of the present invention, the uniform light may be provided to the display panel belonged to the display device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
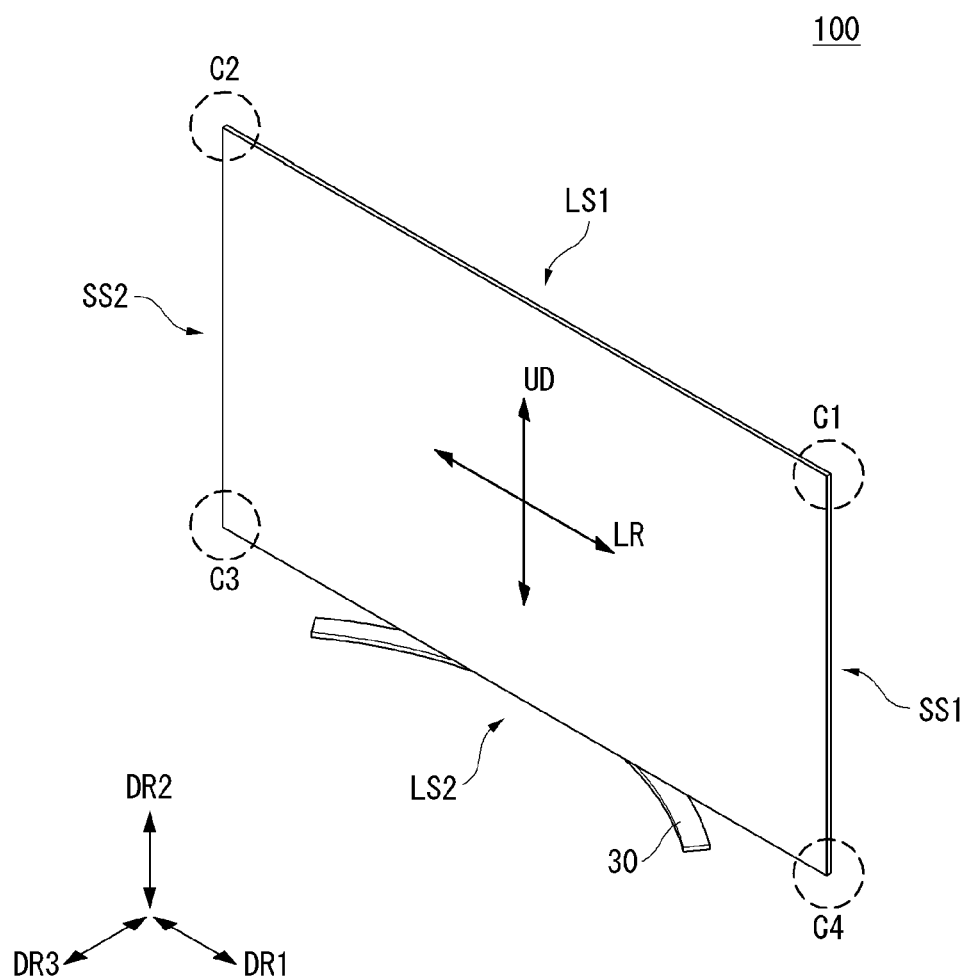
FIGS. 1 to 10 are views showing a general configuration of a display device according to an embodiment of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, a liquid crystal display device (LCD) will be described as an example of the display panel, but the display panel applicable to the present invention may not be limited to the liquid crystal panel.

The display device 100 may include a first long side LS1 and a second long side LS2 opposite to the first long side LS1. The display device 100 may include a first short side SS1 and a second short side SS2 opposite to the first short side SS1. The first short side SS1 may be adjacent to both the first long side LS1 and the second long side LS2.

An area adjacent to the first short side SS1 may be referred to as a first short side area SS1. An area adjacent to the second short side SS2 may be referred to as a second short side area SS2. An area adjacent to the first long side LS1 may be referred to as a first long side area LS1. An area adjacent to the second long side LS2 may be referred to as a second long side area LS2. The first short side area SS1 may be referred to as a first side area. The second short side area SS2 may be referred to as a second side area. The first long side area LS1 may be referred to as a third side area. The second long side area LS2 may be referred to as a fourth side area.

The lengths of the first and second long sides LS1 and LS2 may be longer than the lengths of the first and second short sides SS1 and SS2 for the convenience of explanation. It is also possible that the lengths of the first and second long sides LS1 and LS2 are substantially equal to the lengths of the first and second short sides SS1 and SS2.

The first direction DR1 may be a direction along to the long sides LS1 and LS2 of the display device 100. The second direction DR2 may be a direction along to the short sides SS1 and SS2 of the display device 100.

The third direction DR3 may be a direction normal to the first direction DR1 and/or the second direction DR2.

The first direction DR1 and the second direction DR2 may collectively be referred to as a horizontal direction. In addition, the third direction DR3 may be referred to as a vertical direction.

A side on which the display device 100 displays the image may be referred to as a 'forward direction' or a 'front side' of the display device 100. A side on which the image cannot be viewed may be referred to as a 'rearward direction' or a 'rear side' of the display device 100. From the viewpoint of the front side of the display device 100, the first long side LS1 may be referred to as an upper side or an upper surface, the second long side LS2 side may be referred to as a lower side or a lower surface, the first short side SS1 may be referred to as a right side or the right surface, and the second short side SS2 may be referred to as a left side or a left surface.

The first long side LS1, the second long side LS2, the first short side SS1 and the second short side SS2 may be referred to as an edge of the display device 100. The area where the first long side LS1, the second long side LS2, the first short side SS1, and the second short side SS2 meet with each other may be referred to as a corner. For example, the area where the first long side LS1 and the first short side SS1 meet may be referred to as a first corner C1. The area where the first long side LS1 and the second short side SS2 meet may be referred to as a second corner C2. The area where the second short side SS2 and the second long side LS2 meet may be referred to as a third corner C3. The area where the second long side LS2 and the first short side SS1 meet may be referred to as a fourth corner C4.

The direction from the first short side SS1 to the second short side SS2 or the direction from the second short side SS2 to the first short side SS1 may be referred to as the left and right direction LR. The direction from the first long side LS1 to the second long side LS2 or the direction from the second long side LS2 to the first long side LS1 may be referred to as the up and down direction UD.

Figure 2:
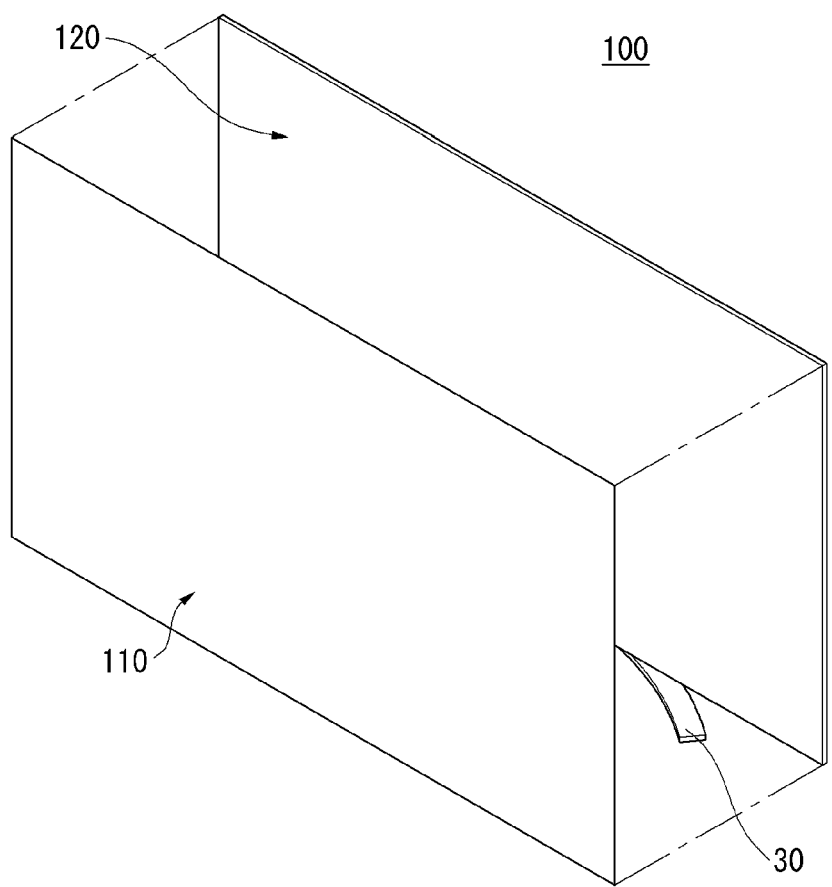

Referring to FIGS. 1 and 2, the display panel 110 may be positioned at the front portion of the display device 100 and can display an image. The display panel 110 divides the image into a plurality of pixels, and outputs the image by adjusting the color, brightness, and saturation of each pixel. The display panel 110 may be divided into an active area on which an image is displayed and an inactive area on which no image is displayed. The display panel 110 may include a first substrate, a second substrate facing the first substrate, and a liquid crystal layer between the first and second substrates. For example, the display panel 110 may include a front substrate and a rear substrate. The first substrate may be referred to as the front substrate. The second substrate may be referred to as the rear substrate.

The backlight unit 120 may be positioned at a rear of the display panel 110. The backlight unit 120 may include a plurality of light sources. The backlight unit 120 may be divided into a direct type or an edge type according to a position of the light source of the backlight unit 120. In case that backlight unit 120 is the edge type, the backlight unit 120 may further include a light guide panel.

The backlight unit 120 may be driven by a full driving method or a partial driving method (local dimming, impulsive, etc.). The backlight unit 120 may include an optical sheet or an optical layer. The pedestal 30 may be positioned below the backlight unit 120 or below the display panel 110. The pedestal 30 can support the backlight unit 120 or support the display panel 110.

Figure 3:
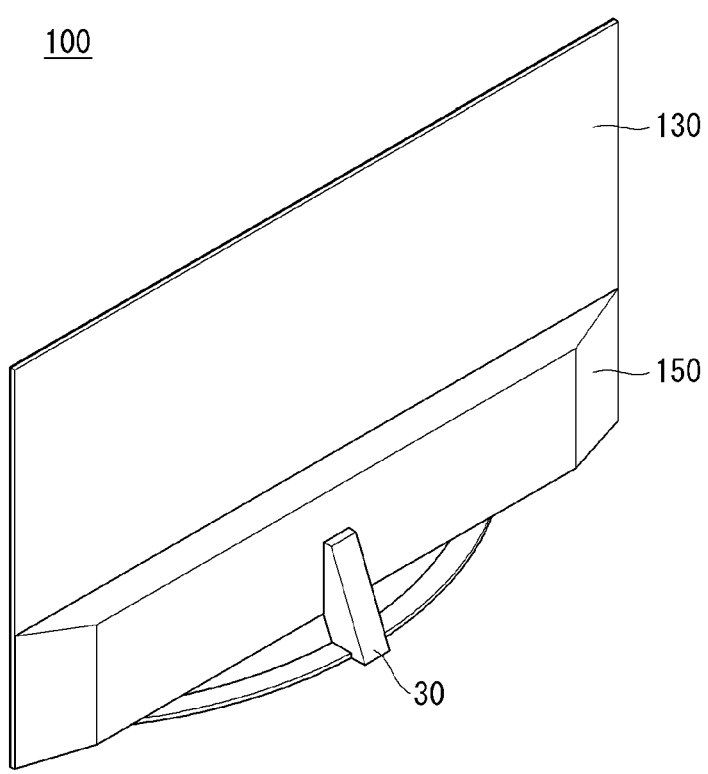
Figure 4:
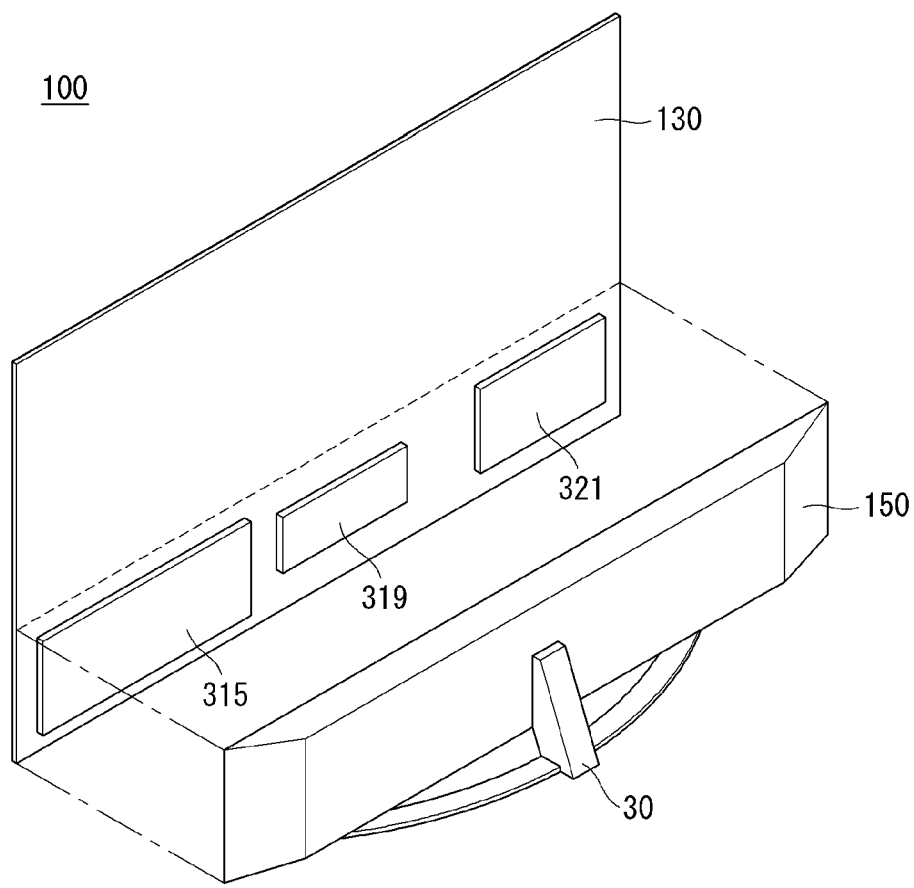

Referring to FIGS. 3 and 4, the frame 130 may support the components of the display device 100. For example, the backlight unit 120 may be coupled to the frame 130. The frame 130 may have a relatively high rigidity. For example, the frame 130 may be made of a metal such as an aluminum alloy. The frame 130 may be referred to as a main frame.

The back cover 150 may form the rear surface of the display device 100. The back cover 150 may form the appearance of the display device 100 at the rear side of the display device 100. The back cover 150 can protect the components of the display device 100 from external shocks. For example, the back cover 150 can protect the power supply 315, the main board 321, and the T-con board 319 from external shocks. The back cover 150 may be coupled to the frame 130. For example, the back cover 150 may comprise a resin. For example, the back cover 150 may be an injection molded article.

The power supply 315 may provide the components of the display device 100 with electric power. The power supply 315 may include a printed circuit board. The power supply 315 can convert an alternating electric current into a direct electric current. The power supply 315 can convert AC power to DC power. The power supply 315 may be coupled to the rear surface of the frame 130.

The main board 321 may be a printed circuit board providing an interface for the display device 100 to operate. The main board 321 can check and manage the operation of the components of the display device 100. The main board 321 may be coupled to the rear surface of the frame 130.

The T-con board 319 may include a printed circuit board. T-con board may transmit power or signals provided from the main board 321 or the power supply 315 to the display panel 110. The T-con board 319 may be electrically connected to the display panel 110 (see FIG. 2) on the front surface of the frame 130 through a FFC cable (Flat Flex Cable). The T-con board 319 may be coupled to the rear surface of the frame 130.

The power supply 315, the main board 321, and/or the T-con board 319 may be collectively referred to as a control unit. The control unit may refer to at least one of the power supply 315, the main board 321, and the T-con board 319.

Figure 5:
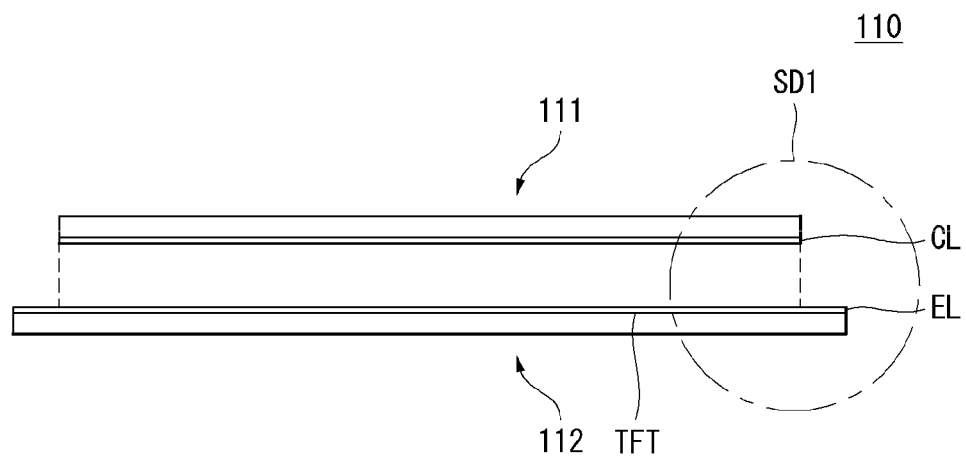

Referring to FIG. 5, the display panel 110 may include a first substrate 111 and a second substrate 112. The first substrate 111 may be exposed to the outside and may form the front surface of the display device 100. The second substrate 112 may be opposed to the first substrate 111.

Liquid crystal may be filled between the first substrate 111 and the second substrate 112. That is, a liquid crystal layer may be formed between the first substrate 111 and the second substrate 112. The first substrate 111 may be referred to as a front substrate, and the second substrate 112 may be referred to as a rear substrate.

The length of the front substrate 111 may be the front side length. The length of the rear substrate 112 can be referred to as a rear side length. The front side length may be smaller than the rear side length. The rear side length may be greater than the front side length. The front substrate 111 may include a color filter. The rear substrate 112 may include a TFT. The TFT may include a black material.

The length of the rear substrate 112 may be greater than the length of the front substrate 111 in order for the TFT wiring to be connected to the outside of the display panel 110. The rear substrate 112 may include an electrode line EL. The electrode line EL can be electrically connected to the TFT. The electrode lines EL provided at the rear substrate 112 may be exposed to the outside of the display panel 110.

The front substrate 111 may have a cover layer CL corresponding to the TFT. For example, the cover layer CL may be black. The TFT may be invisible on the front surface of the display panel 110. The TFT may be referred to as a TFT wiring.

Figure 6:
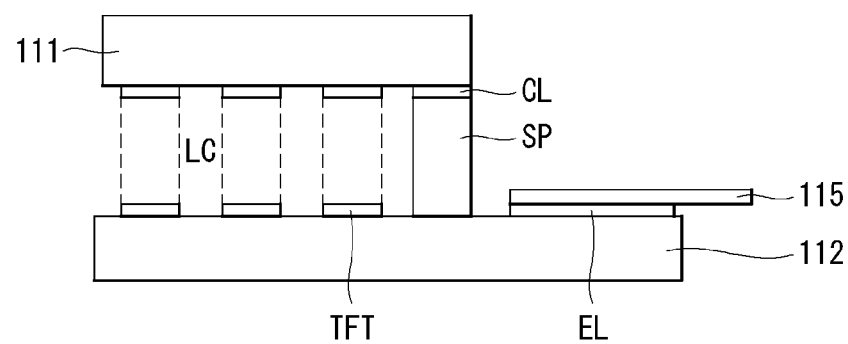

Referring to FIG. 6, a liquid crystal layer LC may be formed between the front substrate 111 and the rear substrate 112. A spacer SP may be positioned between the front substrate 111 and the rear substrate 112. The spacer SP can keep the distance between the front substrate 111 and the rear substrate 112 constant. The thickness of the liquid crystal layer LC positioned between the front substrate 111 and the rear substrate 112 can be kept constant by the spacers SP. In other respects, the spacer SP can improve the structural stability of the display panel 110.

The rear substrate 112 may include a TFT. A plurality of TFTs may be formed on the rear substrate 112. The TFT may form a matrix on the rear substrate 112. The TFT may be formed on part or all of the rear substrate 112. The electrode line EL can be electrically connected to the TFT. The electrode lines EL may be exposed to the outside of the display panel 110 due to the difference in length between the front substrate 111 and the rear substrate 112.

The front substrate 111 may have a cover layer CL. The cover layer CL may face the TFT. The cover layer CL may overlap the TFT. The cover layer CL may cover the TFT. By the cover layer CL, the TFT may not be seen in front of the display panel 110. The cover layer CL may be black.

The display panel 110 may have an active area and an inactive area. An image can be displayed on the active area of the display panel 110. The image may not be displayed on the inactive area of the display panel 110.

The electrode 115 may be electrically connected to the electrode line EL. The electrode 115 may be located in the inactive area. The electrode 115 may be bonded to the electrode line EL exposed to the outside and electrically connected to the TFT. The electrode 115 may be a pad-electrode.

Figure 7:
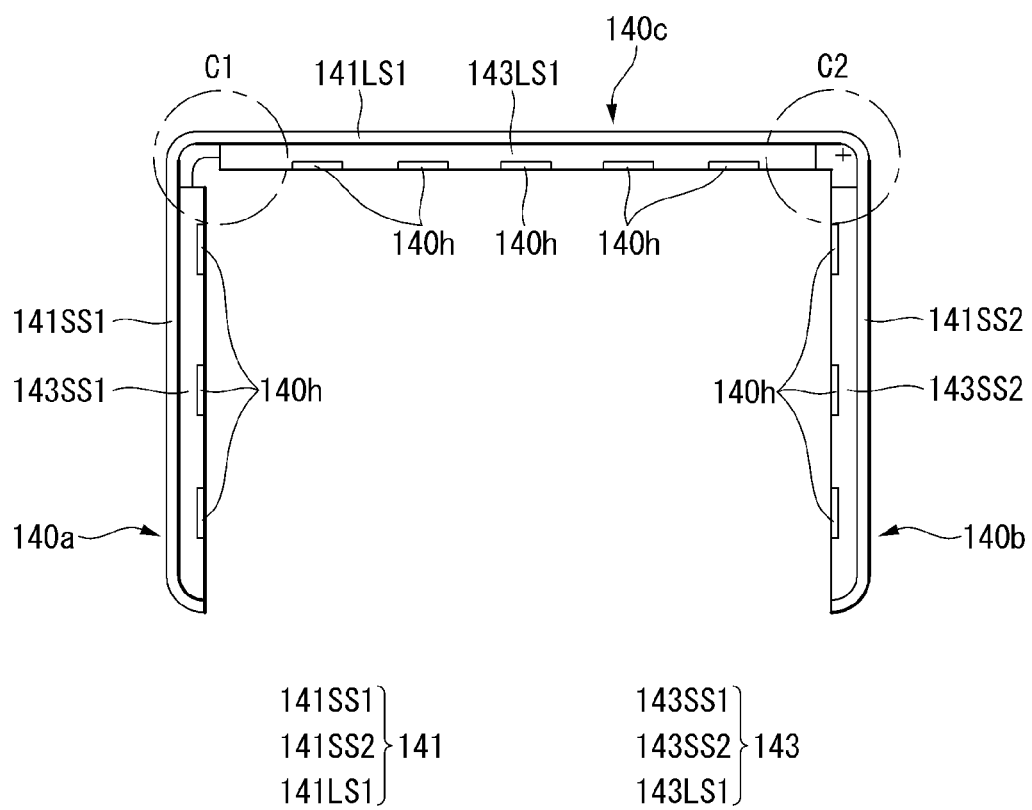

Referring to FIG. 7, the rear surface of the side frame 140 can be observed. The side frame 140 may include an outer frame 141 and an inner frame 143. The outer frame 141 may form an outer circumference of the side frame 140. The outer frame 141 may form a first long side LS1, a first short side SS1, and a second short side SS2 of the display device 100 (see FIG. 1).

The first short side SS1 of the display device 100 (see FIG. 1) may be referred to as a first edge SS1. The second short side SS2 of the display device 100 (see FIG. 1) may be referred to as a second edge SS2. The first long side LS1 of the display device 100 (see FIG. 1) may be referred to as a third edge LS1.

The outer frame 141 may include a first outer frame 141SS1, a second outer frame 141SS2, and a third outer frame 141LS1. The first outer frame 141SS1 may form the first edge SS1 of the display device 100 (see FIG. 1). The second outer frame 141SS2 may form a second edge SS2 of the display device 100 (see FIG. 1). The third outer frame 141LS1 may form the third edge LS1 of the display device 100 (see FIG. 1).

The first outer frame 141SS1, the second outer frame 141SS2, and the third outer frame 141LS1 may be integrally formed. Alternatively, the first outer frame 141SS1, the second outer frame 141SS2, and the third outer frame 141LS1 may be combined.

The inner frame 143 may be connected to the outer frame 141. The inner frame 143 may be extended from the outer frame 141. The inner frame 143 may be plural. The inner frame 143 may be integrally formed with the outer frame 141, or may be separately formed and coupled to the outer frame 141.

The inner frame 143 may include a first inner frame 143SS1, a second inner frame 143SS2, and a third inner frame 143LS1. The inner frame 143 can form a step with respect to the outer frame 141. The inner frame 143 can form a step that is lowered from the outer frame 141. The inner frame 143 may be thinner than the outer frame 141 in front-back direction.

The first inner frame 143SS1 may be extended inward of the side frame 140 from the first outer frame 141SS1. The first inner frame 143SS1 may be a long extended flat plate.

The second inner frame 143SS2 may be extended inward of the side frame 140 from the second outer frame 141SS2. The second inner frame 143SS2 may be a long extended flat plate.

The third inner frame 143LS1 may be extended inward of the side frame 140 from the third outer frame 143LS1. The third inner frame 143LS1 may be a long extended flat plate.

The outer frame 141 can form a body of the side frame 140. The inner frame 143 may be connected to the outer frame 141. The inner frame 143 can provide the components of the display device 100 (see FIG. 4) with a supporting force.

The inner frame 143 may have a groove 140$h$. The grooves 140$h$ may be formed in plural. For example, the first inner frame 143LS1 may have five grooves 140$h$. Five grooves 140$h$ may be sequentially formed on the third inner frame 143LS1. As another example, the first or second inner frames 143SS1 or 143SS2 may have three grooves 140$h$, respectively. The spacing of two successive grooves among the plurality of grooves 140$h$ may be regular or irregular.

The side frame 140 may include a first side frame 140$a$, a second side frame 140$b$, and a third side frame 140$c$. The first side frame 140$a$ may be opposite to the second side frame 140$c$. The third side frame 140$c$ may connect the first side frame 140$a$ and the second side frame 140$b$. An end of the third frame 140$c$ may be connected to the first side frame 140$a$. Another end of the third frame 140$c$ may be connected to the second side frame 140$b$.

The first side frame 140$a$ may include the first outer frame 141SS1 and the first inner frame 143SS1. The second side frame 140$b$ may include the second outer frame 141SS2 and the second inner frame 143SS2. The third side frame 140$c$ may include the third outer frame 141LS1 and the third inner frame 143LS1.

Figure 8:
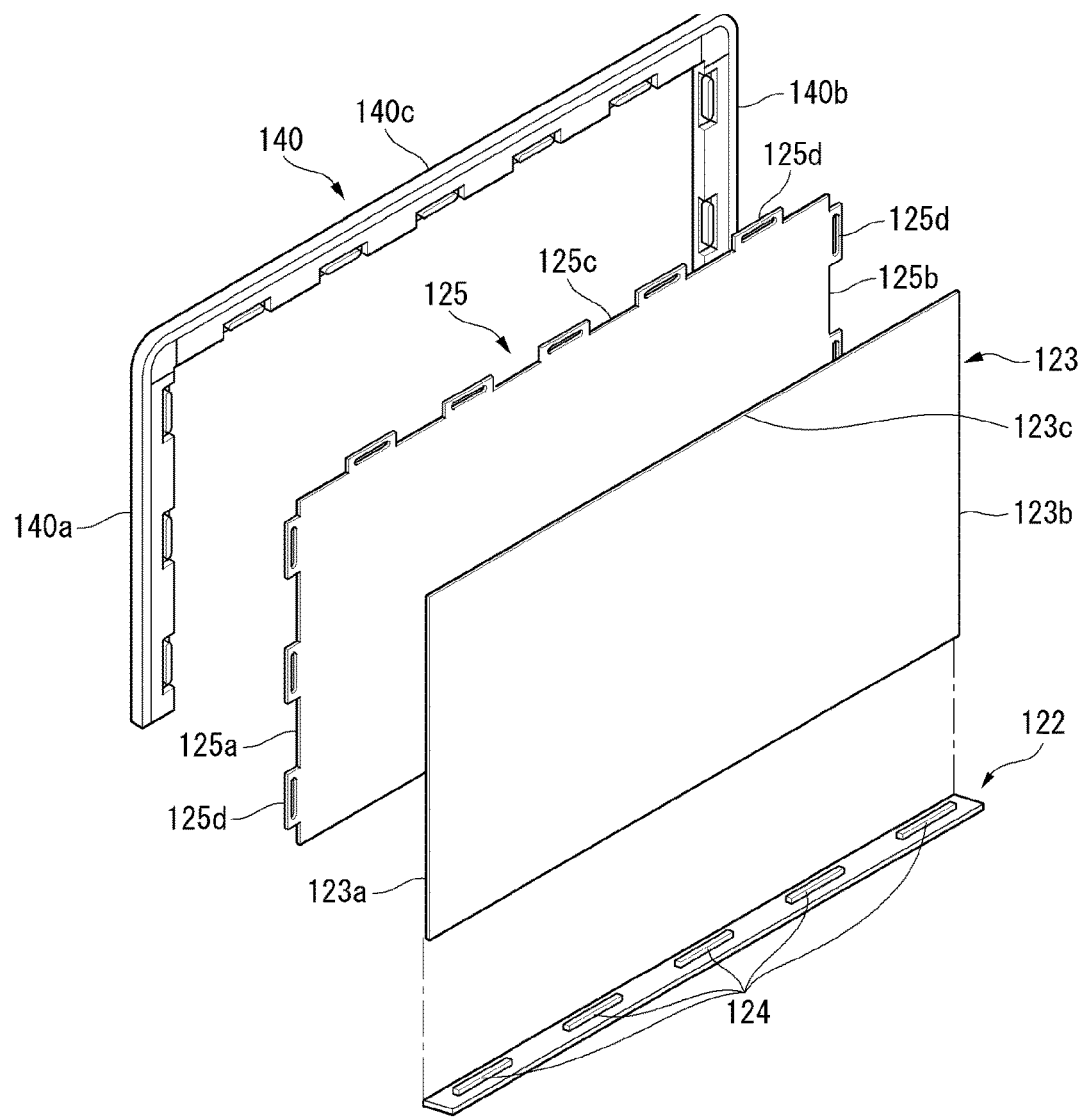

Referring to FIG. 8, the optical sheet 125 may be positioned inside the side frame 140. The optical sheet 125 may be coupled to the side frame 140. The optical sheet 125 can be coupled to the inside of the side frame 140. The optical sheet 125 can be fitted in the groove 140*h* provided at the side frame 140. The optical sheet 125 may include a coupling portion 125*d*. The coupling portion 125*d* can be engaged with the groove 140*h* of the side frame 140.

The optical sheet 125 can form an edge. For example, the optical sheet 125 may form a first edge 125*a*, a second edge 125*b*, and a third edge 125*c*.

The first side frame 140*a* can cover the first edge 125*a* of the optical sheet 125. The second side frame 140*b* can cover the second edge 125*b* of the optical sheet 125. The third side frame 140*c* can cover the third edge 125*c* of the optical sheet 125.

The first edge 125*a* of the optical sheet 125 can be coupled to the first side frame 140*a*. The second edge 125*b* of the optical sheet 125 can be coupled to the second side frame 140*b*. The third edge 125*a* of the optical sheet 125 can be coupled to the third side frame 140*c*.

The optical sheet 125 may transmit the light of the light source to the display panel 110 evenly. The optical sheet 125 may be composed of a plurality of layers. For example, the optical sheet 125 may include at least one prism sheet and/or at least one diffusion sheet.

The optical sheet 125 may include a plurality of sheets having different functions. For example, the optical sheet 125 may include first to third optical sheets. The first optical sheet may function as a diffusion sheet, and the second and third optical sheets may function as a prism sheet. The number and/or position of the diffusion sheet and the prism sheet can be changed. For example, the optical sheet 125 may include a first optical sheet, which is a diffusion sheet, and a second optical sheet, which is a prism sheet.

The diffusion sheet can prevent the light coming from the diffusion plate from being partially intense, thereby making the light distribution more uniform. The prism sheet can condense the light emitted from the diffusion sheet and allow light to be vertically incident on the display panel 110 (see FIG. 2).

The coupling portion 125*d* may be formed on at least one of the edges of the optical sheet 125. The coupling portion 125*d* may be formed on at least one of the first to third optical sheets. The coupling portion 125*d* may be formed at the long side of the optical sheet 125. The coupling portion 125*d* formed on the first long side may have an irregular arrangement. For example, the number of coupling portions 125*d* on the first long side may be different from the number of coupling portions 125*d* on the first or second short side. For example, the position and/or number of the coupling portion 125*d* on the first short side may be different from the position and/or number of the coupling portion 125*d* on the second short side.

At least one optical assembly 124 may be disposed on the substrate 122. An electrode pattern connecting the adapter and the optical assembly 124 may be formed on the substrate 122. For example, a carbon nanotube electrode pattern connecting the optical assembly 124 and the adapter may be formed on the substrate 122. The substrate 122 may include at least one of polyethylene terephthalate (PET), glass, polycarbonate (PC), and silicon. The substrate 122 may be a printed circuit board (PCB) on which at least one optical assembly 124 is mounted.

The optical assembly 124 may be a light emitting diode package. The optical assembly 124 may include a light emitting diode (LED) chip. The optical assembly 124 may comprise a colored LED (emitting at least one of the colors such as red, blue, green, etc.) or a white LED. The colored LED may include at least one of a red LED, a blue LED, and a green LED.

The light source included in the optical assembly 124 may be a COB (Chip On Board) type. LED chip (light source) in COB type, can be directly coupled to the substrate 122. Therefore, the process of manufacturing the substrate 122 on which the COB typed optical assembly 124 is mounted can be relatively simplified. In addition, the COB typed optical assembly 124 may have a relatively low electrical resistance, thereby reducing the heat loss energy. The power efficiency of the optical assembly 124 may be improved due to the low electrical resistance of the COB typed optical assembly 124. The COB typed optical assembly 124 can provide relatively bright illumination. The optical assembly 124 of the COB type can be made thinner and lighter than the conventional one.

The optical layer 123 may evenly provide the light supplied from the optical assembly 124 to the back of the display panel 110 (see FIG. 2). The optical layer 123 can diffuse the light supplied from the optical assembly 124. For example, the optical layer 123 may be a light guide panel. Light provided from the optical assembly 124 to the optical layer 123 may be dispersed throughout the optical layer 123.

The optical layer 123 may be located at a rear of the optical sheet 125. The substrate 122 and/or optical assembly 124 may be located on a side of the optical layer 123. For example, the substrate 122 and/or optical assembly 124 may be located on a lateral side of the optical layer 123. For example, the substrate 122 and/or the optical assembly 124 may be located below the optical layer 123.

The optical layer 123 can form an edge. For example, the optical layer 123 may form a first edge 123*a*, a second edge 123*b*, and a third edge 123*c*.

The first side frame 140*a* can cover the first edge 123*a* of the optical layer 123. The second side frame 140*b* can cover the second edge 123*b* of the optical layer 123. The third side frame 140*c* can cover the third edge 123*c* of the optical layer 123.

The first edge 123*a* of the optical layer 123 may be coupled to the first side frame 140*a*. The second edge 123*b* of the optical layer 123 may be coupled to the second side frame 140*b*. The third edge 123*c* of the optical layer 123 may be coupled to the third side frame 140*c*.

Figure 9:
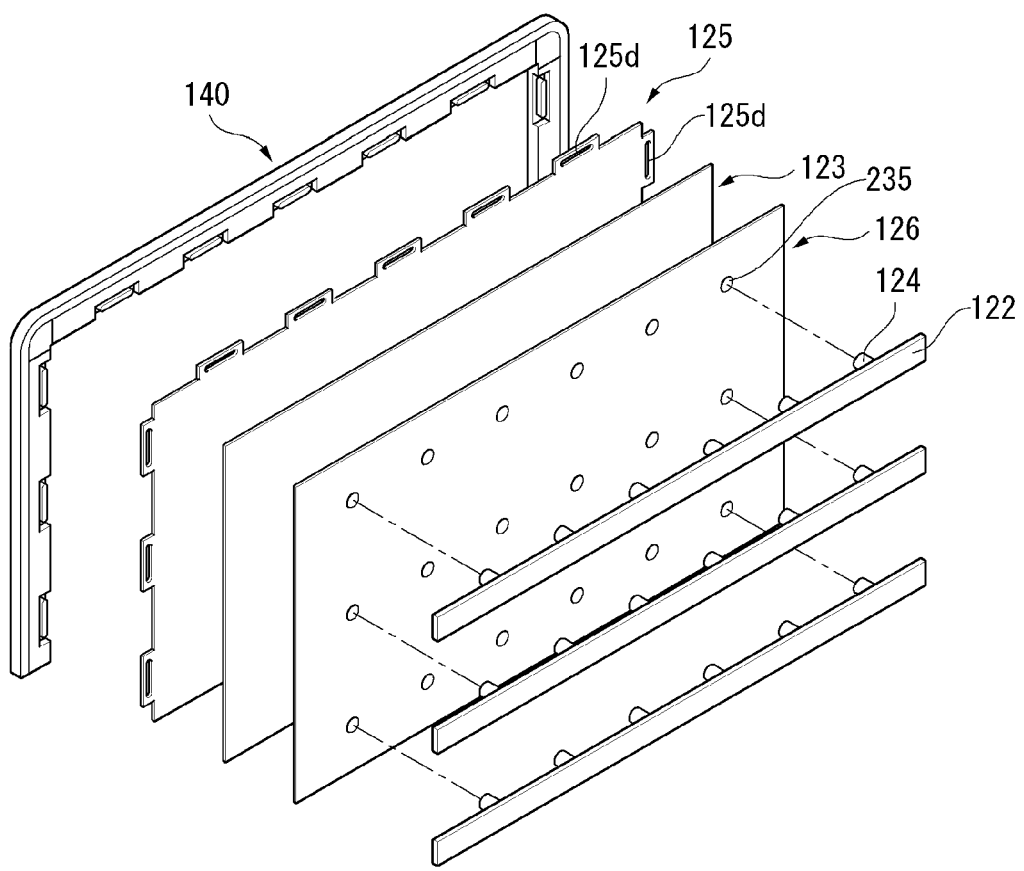

Referring to FIG. 9, the reflective sheet 126 may be located at a rear of the optical layer 123. The reflective sheet 126 may include a plurality of through-holes 235 or holes 235. The plurality of through-holes 235 may be corresponded to the plurality of optical assemblies 124. The through-hole 235 can accommodate the optical assembly 124. The optical assembly 124 may be located in the through-hole 235.

The substrate 122 may be positioned at a rear of the reflective sheet 126. The substrate 122 may be in the form of a plurality of straps extending in a first direction and spaced a certain distance in a second direction normal to the first direction.

The reflective sheet 126 may reflect light emitted from the optical assembly 124 toward the display panel 110. Further, the reflective sheet 126 can reflect light reflected from the optical layer 123 again.

The reflective sheet 126 may comprise a material having a high reflectance. For example, the reflective sheet 126 may comprise at least one of a metal and a metal oxide. For example, the reflective sheet 126 may include at least one of aluminum (Al), silver (Ag), gold (Au), and titanium dioxide (TiO2).

The reflective sheet 126 may be formed by depositing and/or coating a metal or metal oxide on the substrate 122. An ink containing a metal can be printed on the reflection sheet 126. On a surface of the reflective sheet 126, a vapor deposition layer using a vacuum deposition method such as a thermal evaporation method, an evaporation method, or a sputtering method, may be formed. A coating layer and/or a printing layer using a printing method, a gravure coating method, or a silk screen method may be formed on the reflective sheet 126.

Figure 10:
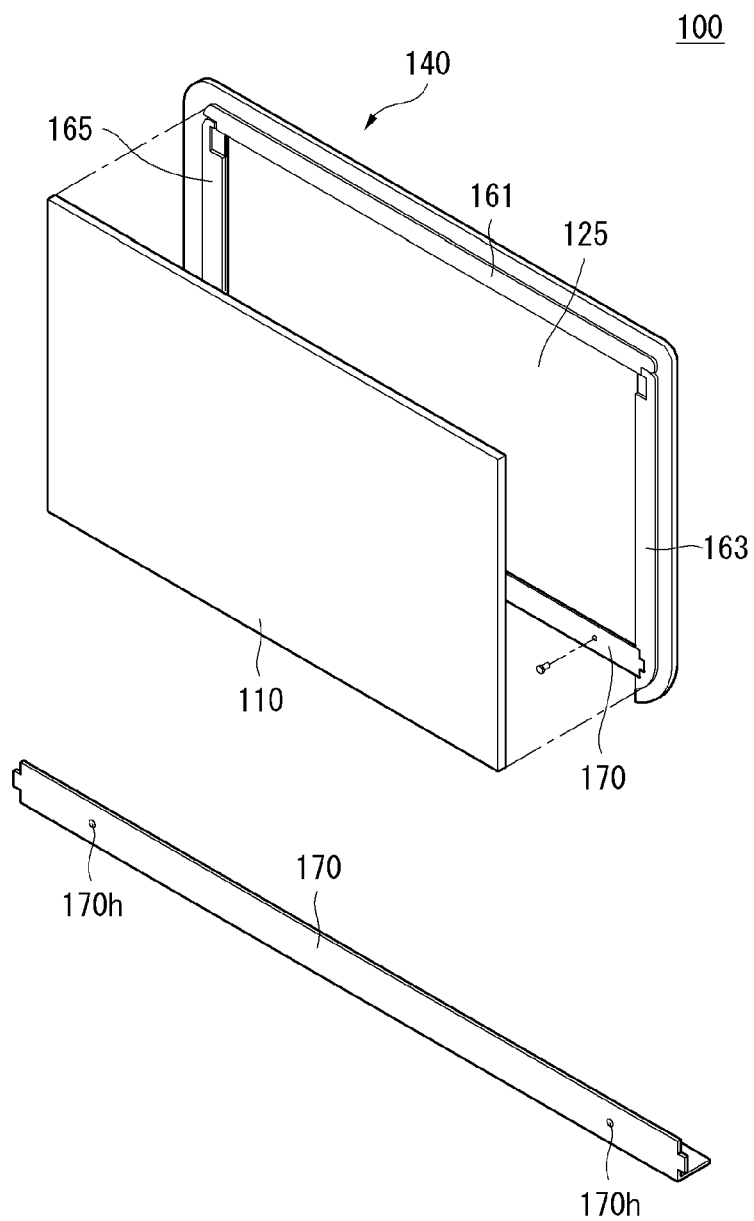

Referring to FIG. 10, the bracket 170 may be coupled to the side frame 140. A bracket hole 170h may be formed on the bracket 170. The bracket 170 may be bolted to the frame 130. The bolt can be inserted into the bracket hole 170h.

The display panel 110 may be coupled to the front side of the side frame 140. The display panel 110 may be fixed to the front surface of the side frame 140. The display panel 110 may be adhered to the front surface of the side frame 140. The display panel 110 may be fixed to the front surface of the side frame 140 by adhesive members 161, 163, 165.

The display panel 110 may be coupled to an outer surface of the side frame 140. The lateral surface of the display panel 110 may be exposed to the outside.

The rear surface of the display panel 110 may not be observed from the outside by the side frames 140 and/or the frame 130. On the other hand, the front surface and the lateral surface of the display panel 110 can be observed at the outside. The display panel 110 may be located outside of the side frame 140 and/or the frame 130.

FIGS. 11 to 14 are views showing examples of cross-sections of a display device related to the present invention.

Figure 11:
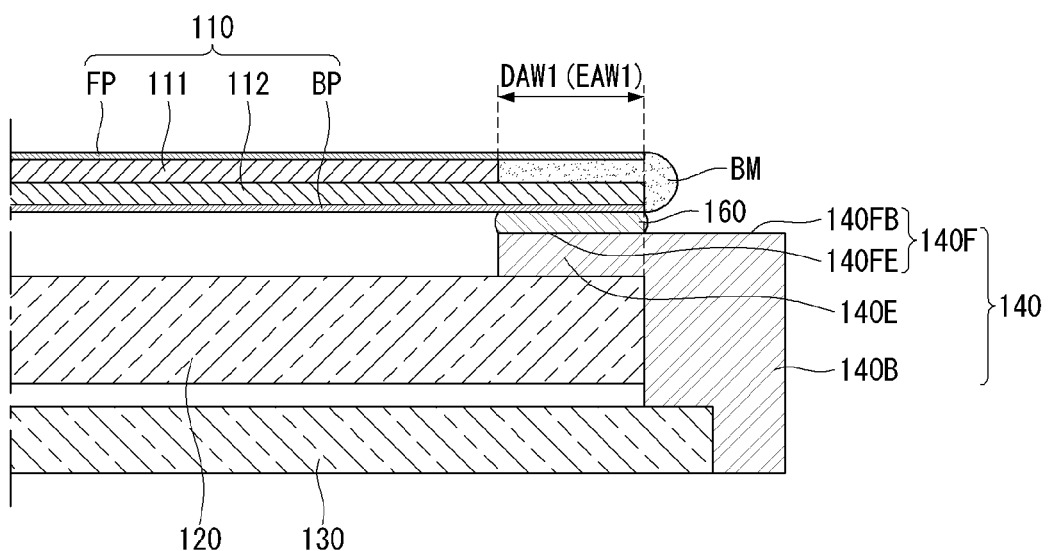
FIGS. 11 to 14 are views showing examples of cross sections of a display device related to the present invention.

Referring to FIG. 11, the main frame 130 may be positioned behind the backlight unit 120. The side frame 140 may be located on the lateral side of the backlight unit 120. The side frame 140 may be positioned along an edge of the backlight unit 120. The side frame 140 may be located on the lateral side of the main frame 130. The side frame 140 may be positioned along an edge of the main frame 130. The side frame 140 may be coupled to the main frame 130. The side frame 140 may be coupled to the backlight unit 120.

The side frame 140 may include a side frame body 140B and a side frame extension 140E. The side frame body 140B may be located along the edge of the main frame 130 or along the edge of the backlight unit 120.

The side frame extension 140E may be extended from the side frame body 140E toward a central portion of the backlight unit 120. The side frame extension 140E may be extended from the side frame body 140B toward the central portion of the backlight unit 120 as much as a first extension width EAW1.

The side frame extension 140E may be positioned in front of the backlight unit 120. The side frame extension 140E may be positioned between the backlight unit 120 and the display panel 110. The side frame body front surface 140FB may be formed on the side frame body 140B. The side frame body front surface 140FB can face the front of the display panel 110.

The side frame extension front surface 140FE can be formed on the side frame extension 140E. The side frame extension front surface 140FE can face the rear surface of the display panel 110.

The side frame front surface 140F may be formed on the side frame 140. The side frame front face 140F may include the side frame body front surface 140FB and the side frame extension front surface 140FE. The side frame body front surface 140FB and the side frame extension front surface 140FE can be connected to each other. The side frame body front surface 140FB and the side frame extension front surface 140FE can be formed on the same plane.

The adhesive member 160 can couple the side frame 140 with the display panel 110. The adhesive member 160 may be positioned between the side frame 140 and the display panel 110. The adhesive member 160 may be positioned between the side frame extension 140E and the display panel 110. The adhesive member 160 can be fixed to the side frame extension front surface 140FE. The adhesive member 160 may have the shape of a pad. The adhesive member 160 may be referred to as an adhesive pad.

The display panel 110 may include a front substrate 111 and a rear substrate 112. The liquid crystal layer LC (see FIG. 6) can be located between the front substrate 111 and the rear substrate 112. The rear substrate 112 may be located behind the front substrate 111. The rear substrate 112 can be coupled to the front substrate 111. The rear substrate 112 may be longer than the front substrate 111. The area of the rear substrate 112 may be larger than the area of the front substrate 111. The front substrate 111 may not cover all of the rear substrate 112. A portion of the rear substrate 112 that is not overlapped with the front substrate 111 may not display an image. The rear substrate 112 may protrude from the front substrate 111 as much as a first dark area width DAW1. The first dark area width DAW1 may correspond to the first extension width DAW1. The first dark area width DAW1 may be a dark border area of the display panel 110 when the display panel 110 is observed at front of the display device 100.

A black matrix (BM) may be disposed on a front surface of a part of the rear substrate 112 that is not covered by the front substrate 111. The black matrix BM may be positioned in front of the rear substrate 112. The black matrix BM may be extended to the edge of the rear substrate 112 from an edge of the front substrate 111 as much as the first dark area width DAW1.

The display panel 110 may be positioned in front of the backlight unit 120. The display panel 110 may include a first polarizing layer FP and a second polarizing layer BP. The first polarizing layer FP may cover the front surface of the front substrate 111. The second polarizing layer BP may cover the rear surface of the rear substrate 112.

The backlight unit 120 can provide the display panel 110 with light. The backlight unit 120 may provide the rear surface of the display panel 110 with light. The backlight unit 120 may refer to at least one of an optical layer and an optical sheet. The backlight unit 120 may include at least one of an optical layer or an optical sheet.

Figure 12:
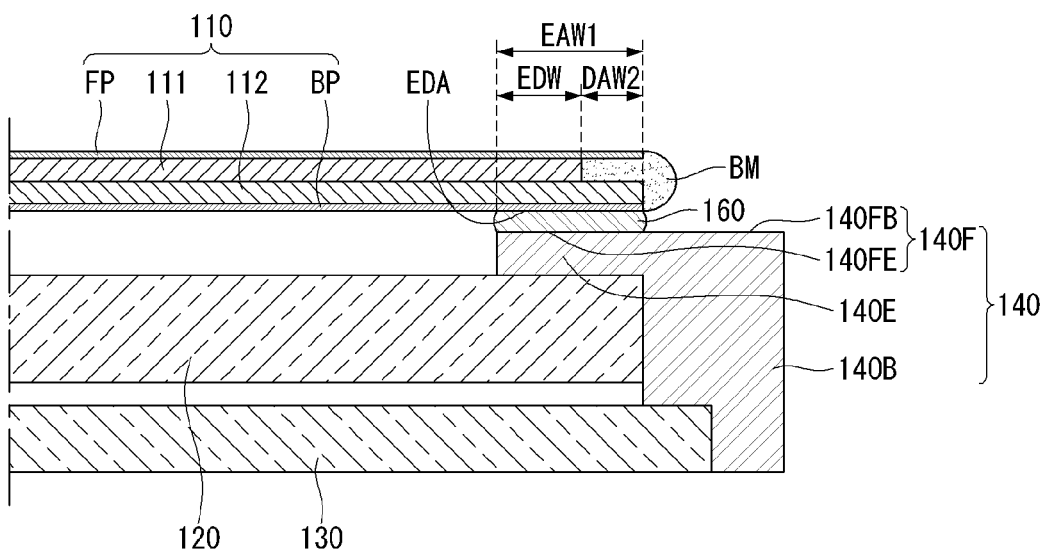

The display device 100 shown in FIG. 12 can be described in comparison with the device 100 shown in FIG. 11. Referring to FIG. 12, the rear substrate 112 may be extended as much as the second dark area width DAW2 with respect to the front substrate 111. The second dark area width DAW2 may be smaller than the first dark area width DAW1 (see FIG. 11).

The side frame extension 140E may be extended from the side frame body 140B toward the central portion of the backlight unit 120 as much as a first extension width EAW1. The first extension width EAW1 may be greater than the second dark area width DAW2.

The display panel 110 may include an extended display area EDA. The extended display area EDA may correspond to the difference between the first extension width EAW1 and the second dark area width DAW2.

The extended display area EDA can be overlapped with the adhesive member 160 or the side frame 140 in the front-rear direction. The extended display area EDA may not be sufficiently supplied with light from the backlight unit 120.

Figure 13:
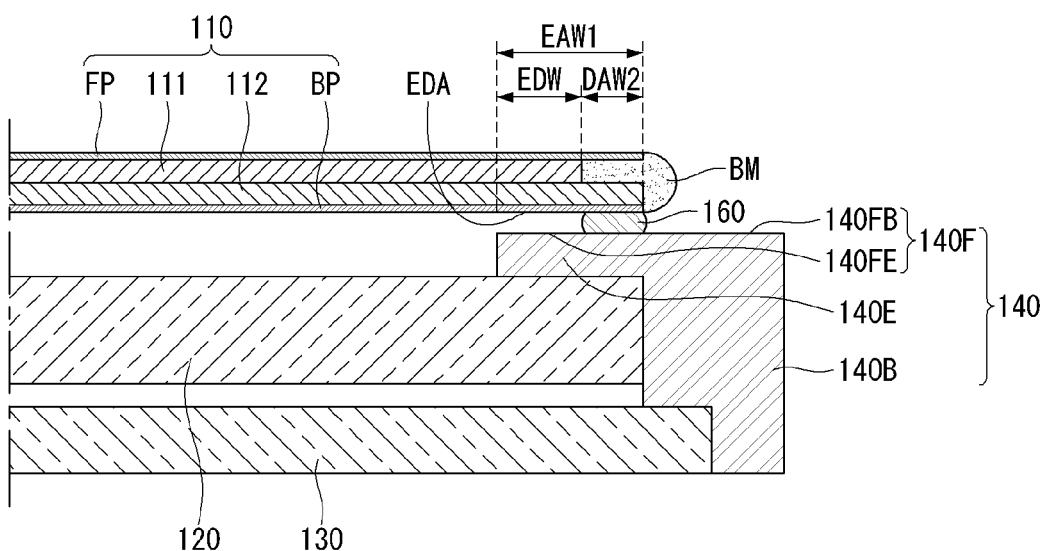

The display device 100 shown in FIG. 13 can be described in comparison with the display device 100 shown in FIG. 12. Referring to FIG. 13, the position of the adhesive member 160 may be corresponded to the position of the black matrix BM. The side frame extension 140E can be located between the extended display area EDA and the backlight unit 120. The adhesive member 160 may not be disposed between the extended display area EDA and the backlight unit 120. The extended display area EDA may not receive sufficient light from the backlight unit 120 because the side frame extension 140E is located between the extended display area EDA and the backlight unit 120.

Figure 14:
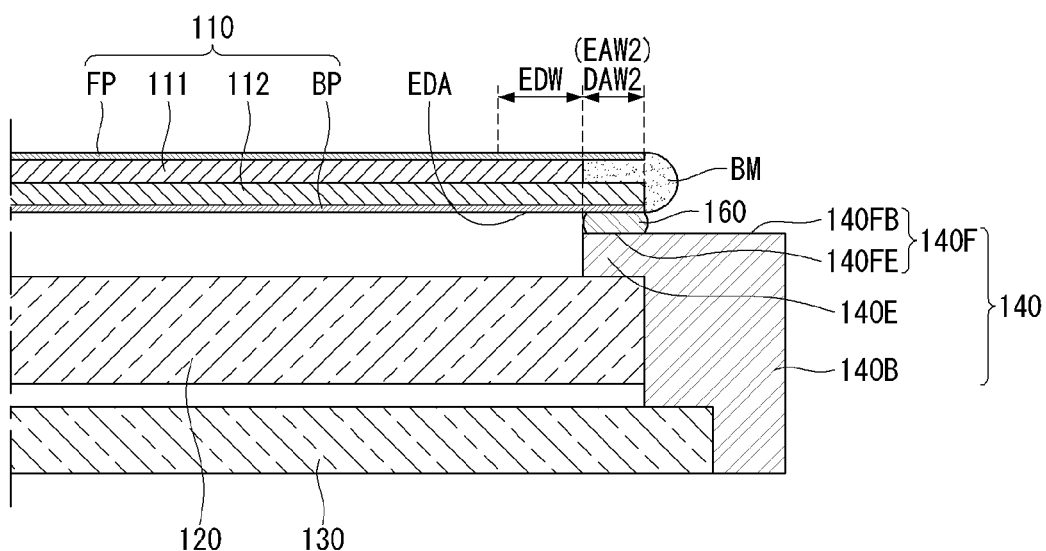

The display device 100 shown in FIG. 14 can be described in comparison with the display device 100 shown in FIGS. 12 and 13. Referring to FIG. 14, the side frame extension 140E may extend from the side frame body 140B by a second extension width EAW2 toward the central portion of the backlight unit 120. The second extension width EAW2 may be smaller than the first extension width EAW1 (see FIG. 13). The second extension width EAW2 may correspond to the second dark area width DAW2. The adhesive member 160 may be positioned between the side frame extension 140E and the display panel 110.

The width of the adhesive member 160 shown in FIG. 14 may correspond to the second extension width EAW2. The width of the adhesive member 160 shown in FIG. 12 may correspond to the first extension width EAW1. The bonding force between the adhesive member 160 and the side frame extension 140E may depend on the width of the adhesive member 160 distributed on the side frame extension 140E. For example, the bonding force between the adhesive member 160 and the side frame extension 140E can have a positive correlation with the width of the adhesive member 160 distributed on the side frame extension 140E. The width of the adhesive member 160 corresponding to the second extension width EAW2 may not be sufficient for the coupling between the adhesive member 160 and the side frame extension 140E. A structure capable of sufficiently providing light to the extended display area EDA may be required while ensuring a sufficient width of the adhesive member 160 distributed on the side frame extension 140E.

Figure 15:
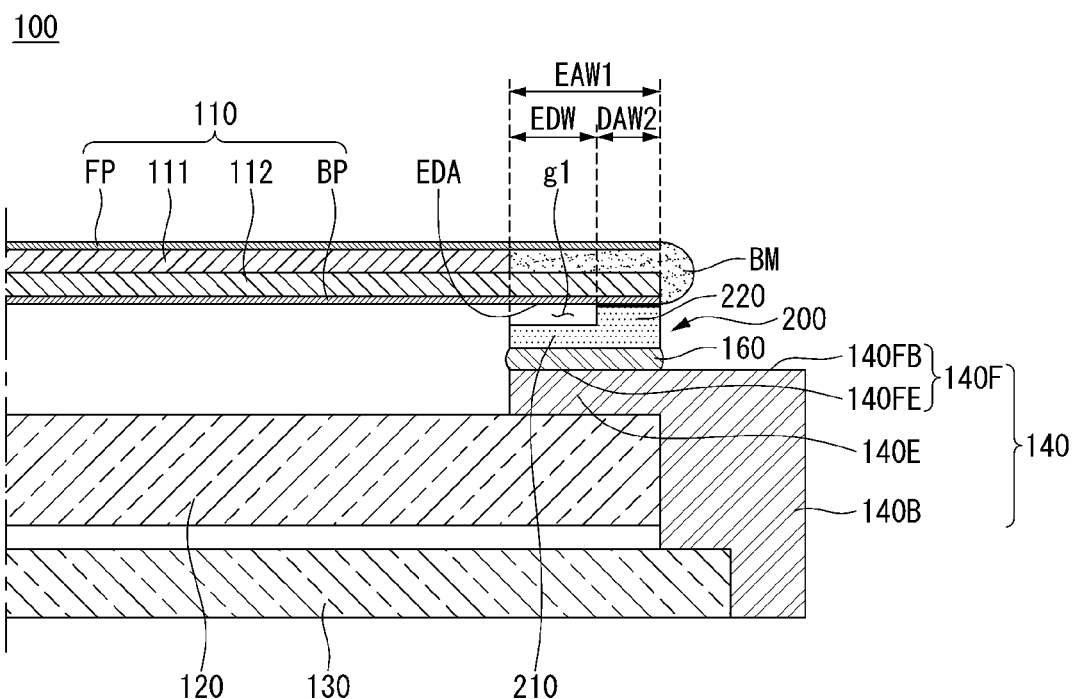
FIGS. 15 and 16 are cross-sectional views of various embodiments of a display device of the present invention.
Figure 16:
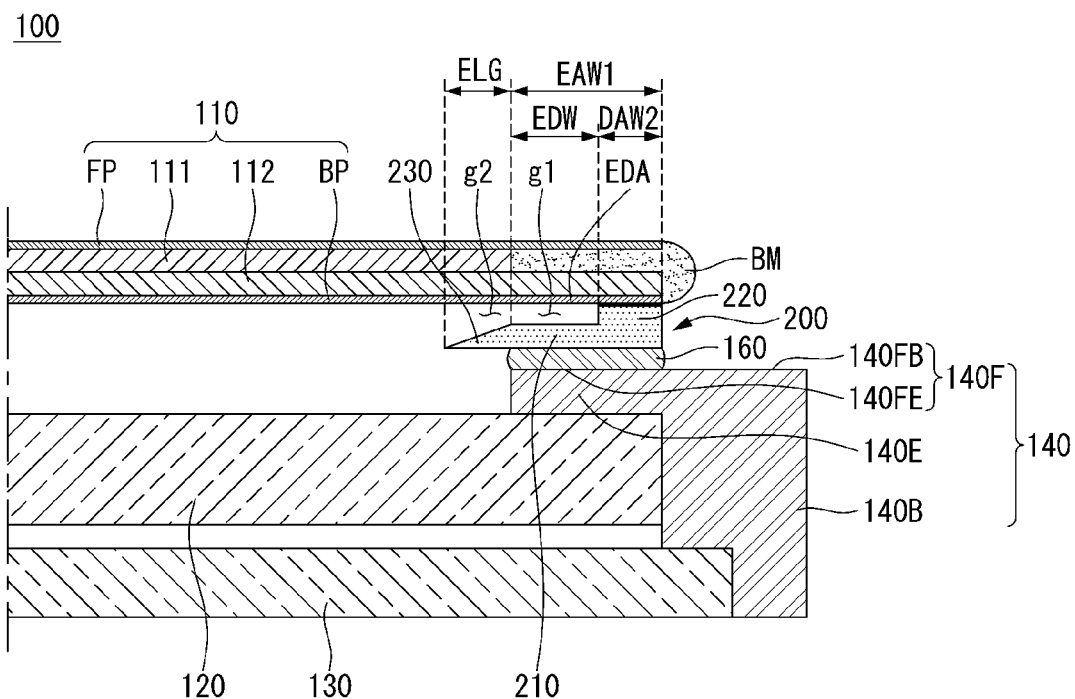

FIGS. 15 and 16 are cross-sectional views of a display device 100 including a light guide module 200 according to various embodiments.

Referring to FIG. 15, the light guide module 200 may be disposed between the display panel 110 and the adhesive member 160. The light guide module 200 may have a refractive index of more than one. For example, the light guide module 200 may include a polycarbonate. For example, the light guide module 200 may include PMMA (PolyMethylMethAcrylate). For example, the light guide module 200 may include MS (methylmethacrylate-styrene).

The light guide module 200 may include a first body 210 and a second body 220. The first body 210 may be in contact with the adhesive member 160. The first body 210 may correspond to the first extension width EAW1.

The second body 220 may extend from the first body 210 toward the display panel 110. The second body 220 may correspond to the second dark area width DAW2. The second body 220 may be formed integrally with the first body 210. The second body 220 may be attached to the rear surface of the display panel 110. A body 210 and 220 of the light guide module 200 may refer to at least one of the first body 210 and the second body 220.

A first gap g1 may be formed between the first body 210 of the light guide module 200 and the display panel 110. The first gap g1 may correspond to the extended display area EDA.

The light guide module 200 may be coupled to the side frame 140 by an adhesive member 160. The light guide module 200 may be coupled to the display panel 110 by UV bonding. The light guide module 200 may have a relatively high rigidity. The light guide module 200 can transmit or refract light. The light guide module 200 may transmit light incident from the backlight unit 120 to the extended display area EDA. The width of the extended display area EDA may be an extended display width EDW. The amount of light incident onto the light guide module 200 from the backlight unit 120 may be insufficient.

Referring to FIG. 16, the light guide module 200 may include a wing portion 230. The wing portion 230 may have the shape of a wedge. The wing portion 230 of the light guide module 200 may extend from the first body 210 of the light guide module 200. The wing portion 230 may extend from the first body 210 toward the center portion of the display device 100 as much as a guide extension distance ELG. A second gap g2 may be formed between the wing portion 230 and the display panel 110.

The wing portion 230 may have the shape of a wedge. The wing portion 230 may have a narrow cross-section as it goes away from the first body 210. The wing portion 230 may transmit the light provided from the backlight unit 120 to the first body 210. A portion of the light incident onto the wing portion may propagate toward the first body 210. The first body 210 may provide at least portion of the light incident onto the first body 210 to the display extension area EDA.

Figure 17:
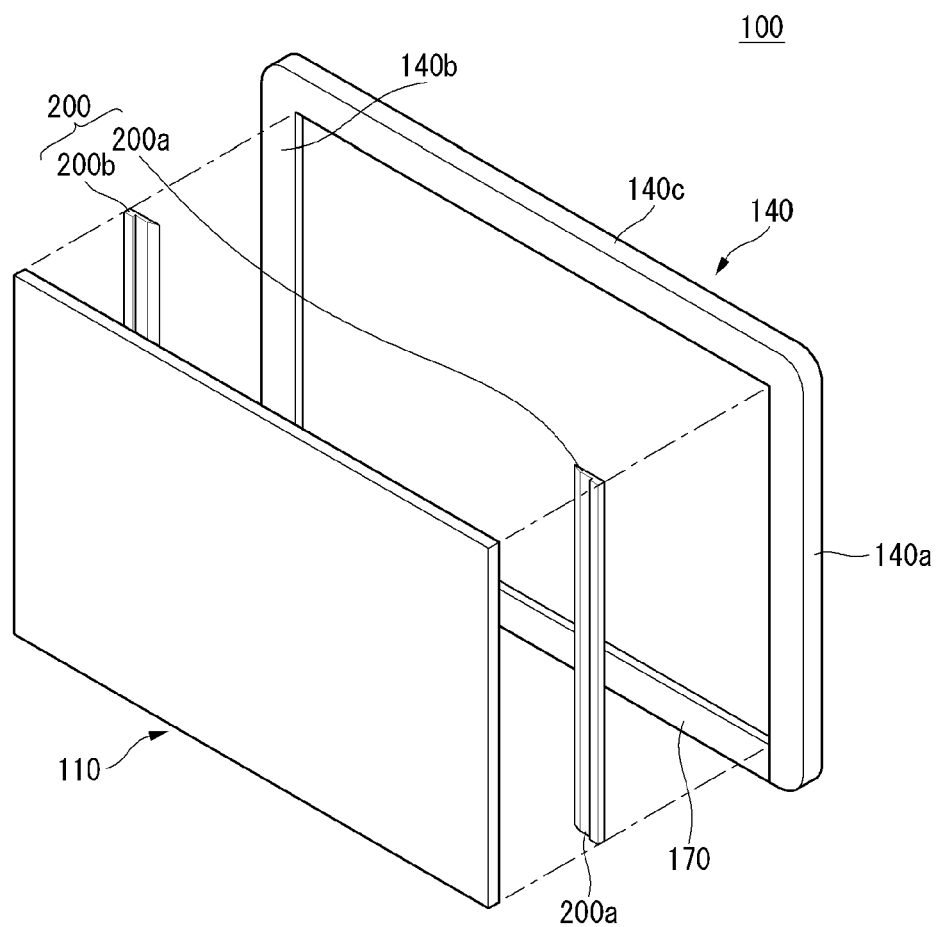
FIGS. 17 and 18 are views showing various embodiments according to which the light guide module is disposed.
Figure 18:
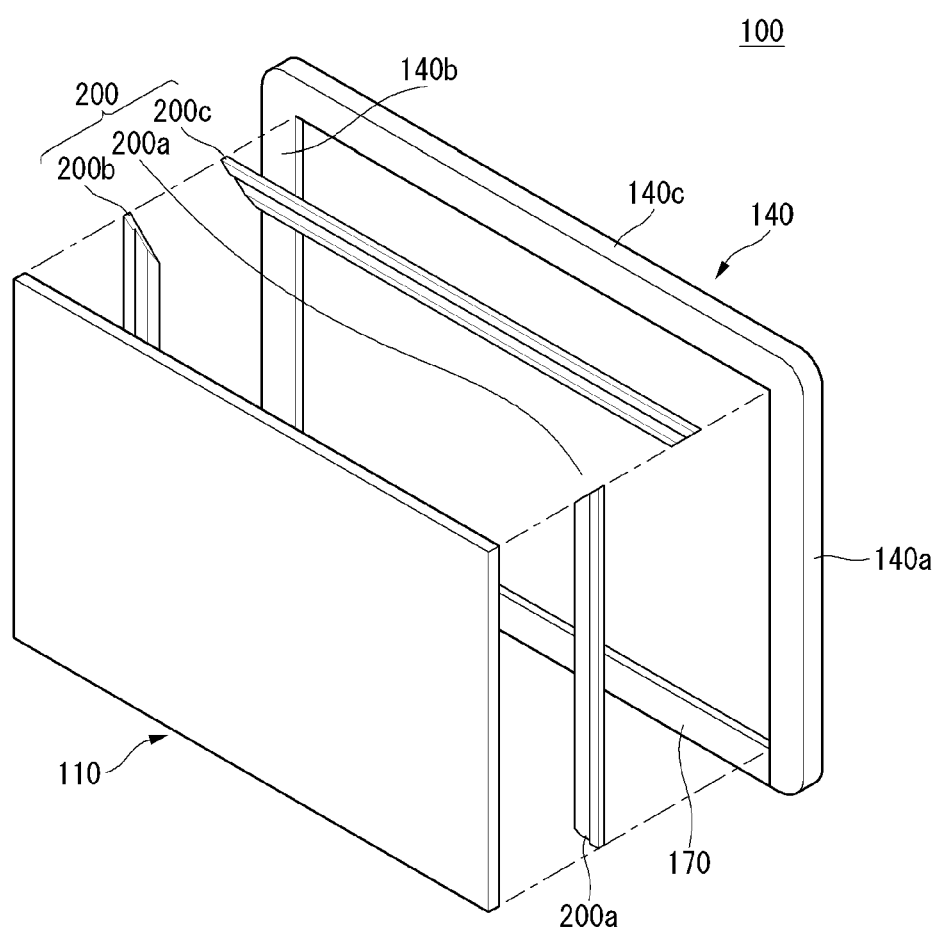

FIGS. 17 and 18 are views showing an embodiment in which the light guide module 200 is disposed between the display panel 110 and the side frame 140.

Referring to FIG. 17, the light guide module 200 may include a first light guide module 200a and a second light guide module 200b. The first light guide module 200a and the second light guide module 200b may be disposed along the edges of the display panel 110. The first light guide module 200a and the second light guide module 200b may have a shape elongated along edges of the display panel 110.

The second light guide module 200b may be positioned opposite the first light guide module 200a. The first light guide module 200a and the second light guide module 200b may be located at short sides of the display device 100. The first light guide module 200a and the second light guide module 200b may be disposed on left and right sides of the display device 100.

The first light guide module 200a may be disposed between the display panel 110 and the first side frame 140a. The second light guide module 200b may be disposed between the display panel 110 and the second side frame 140b.

Referring to FIG. 18, the light guide module 200 may include a first light guide module 200a, a second light guide module 200b, and a third light guide module 200c. The third light guide module 200c may be disposed at the upper portion of the display device 100. The overall shape of the light guide module 200 may correspond to the overall shape of the side frame 140. The third light guide module 200c may be disposed between the display panel 110 and the third side frame 140c.

FIGS. 19 to 31 are views showing various embodiments of the light guide module.

Figure 19:
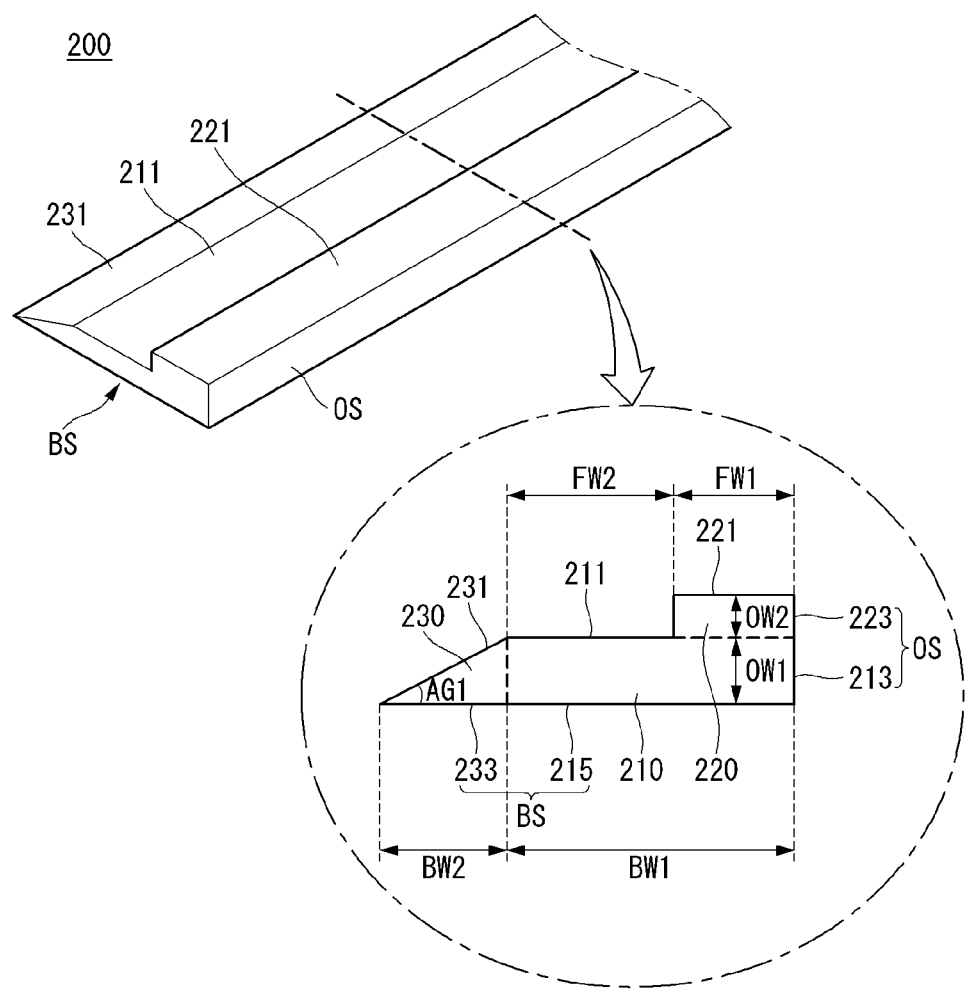
FIGS. 19 to 31 are views showing various embodiments of the light guide module.

Referring to FIG. 19, the light guide module 200 may have the shape of a bar having a specific cross section. The light guide module 200 may include the first body 210, the second body 220, and the wing portion 230.

The first body 210 may include a first body front surface 211, a first body rear surface 215, and a first body lateral surface 213. The first body front surface 211, the first body rear surface 215 and the first body lateral surface 213 may form an outer surface of the first body 210. The first body lateral surface 213 may face the exterior of the display device 100 (see FIG. 16).

The first body front surface 211 may face the display panel 110 (see FIG. 16). The first body front surface 211, for example, may be alongside of the display panel 110 (see FIG. 16). The first body front surface 211, for example, may be alongside of the first body rear surface 215. The first body rear surface 215 may face the adhesive member 160 (see FIG. 16). The first body rear surface 215 can be coupled to the adhesive member 160 (see FIG. 16).

The second body 220 may extend from the first body 210. The second body 220 may be positioned in front of the first body 210. The second body 220 may include a second body front surface 221 and a second body lateral surface 223. The second body front surface 221 may face the front of the second body 220. The second body front surface 221 may face the display panel 110 (see FIG. 16). The second body front surface 221 can be coupled to the display panel 110 (see FIG. 16). The second body lateral surface 223 may form the lateral appearance of the second body 220. The second body lateral surface 223 may face the exterior of the display device 100 (see FIG. 16). The outer surface OS of the light guide module 200 may include at least one of the first body lateral surface 213 and the second body lateral surface 223.

The wing portion 230 may extend from the first body 210. The wing portion 230 may include a first surface 231 and a second surface 233. The first surface 231 and the second surface 233 may be formed on the wing portion 230. The first surface 231 and the second surface 233 can form an angle. For example, the first surface 231 and the second surface 233 may form a first angle AG1. For example, the first angle AG1 may be less than 45 degrees.

The first surface 231 may be slanted with respect to the display panel 110. The first surface 231 can form an inclination with the first body front surface 211. The first surface 231 may meet with the first body front surface 211. The first surface 231 may extend from the first body front surface 211. The first surface 231 may be bent and extended from the first body front surface 211 toward the rear of the first body 210.

The second surface 233 may meet with the first body rear surface 215. The second surface 233 may extend from the first body rear surface 215. The back surface BS of the light guide module 200 may include at least one of a first body rear surface 215 or a second surface 233.

The second surface 233 of the wing portion 230 can face the backlight unit 120 (see FIG. 16). The light guide module 200 can be provided with light from the backlight unit 120 (see FIG. 16) through mainly the second surface 233. Light incident onto the second surface 233 can be refracted on the second surface 233. A portion of the light refracted at the second surface 233 may be directed to the bodies 210 and 220 of the light guide module 200. Another portion of the light refracted at the second surface 233 may move toward the first surface 231 of the wing 230. The first surface 231 may guide at least a portion of the light arriving at the first surface 231 to the bodies 210 and 220 of the light guide module 200.

The second surface 233 of the wing portion 230 can be referred to as an incident surface 233. The first surface 231 of the wing portion 230 can be referred to as a guide surface 231. The first surface 231 can meet the second surface 233. The first surface 231 may extend from the second surface 233.

At least a portion of the light incident onto the bodies 210 and 220 of the light guide module 200 may reach the display extension area EDA (see FIG. 16) through the first body front surface 211.

The rear width of the first body 210 may be referred to as a first back width BW1. The thickness of the first body 210 may be a first outer thickness OW1. The forward width of the second body 220 may be referred to as a first front width FW1. The width of the first body front surface 211 may be referred to as a second front width FW2. The rear width of the wing portion 230 may be referred to as a second back width BW2. For example, the second back width BW2 may be greater than half of the first back width BW1. For example, the second back width BW2 may be greater than half of the second front width FW2.

Figure 20:
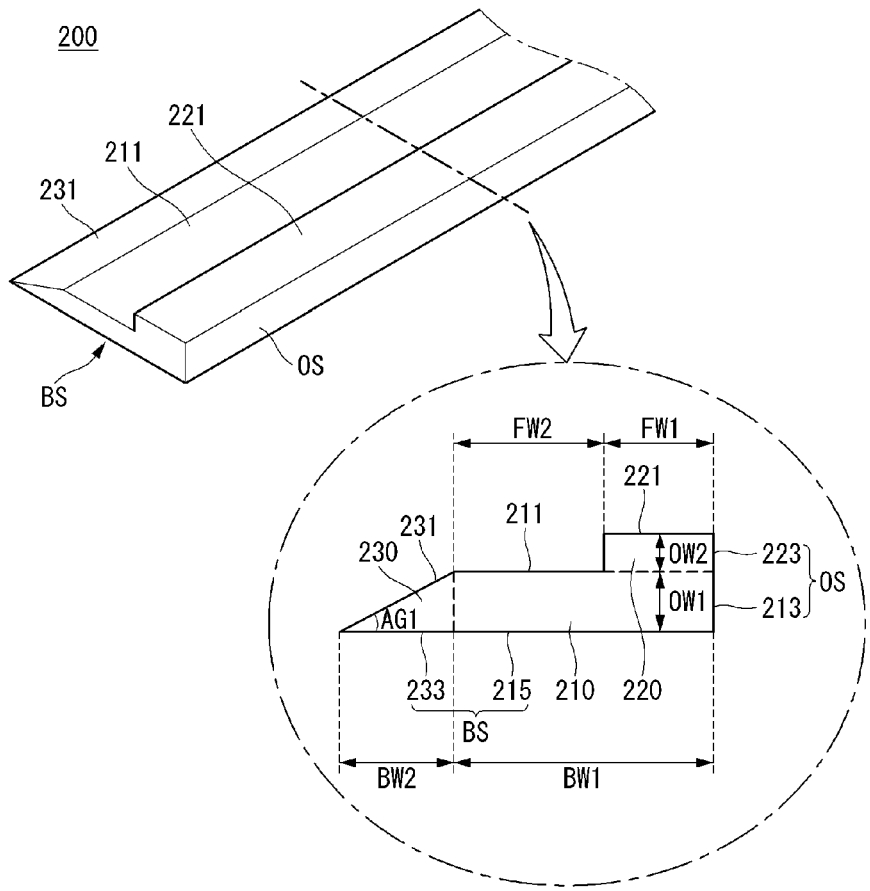
Figure 20:
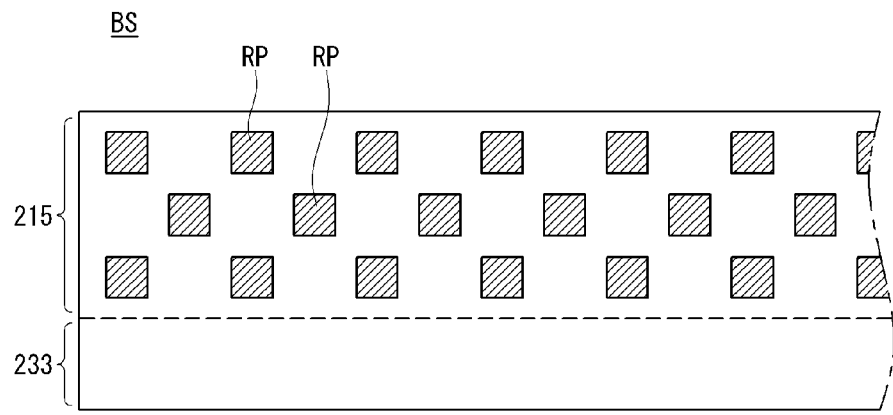
Figure 21:
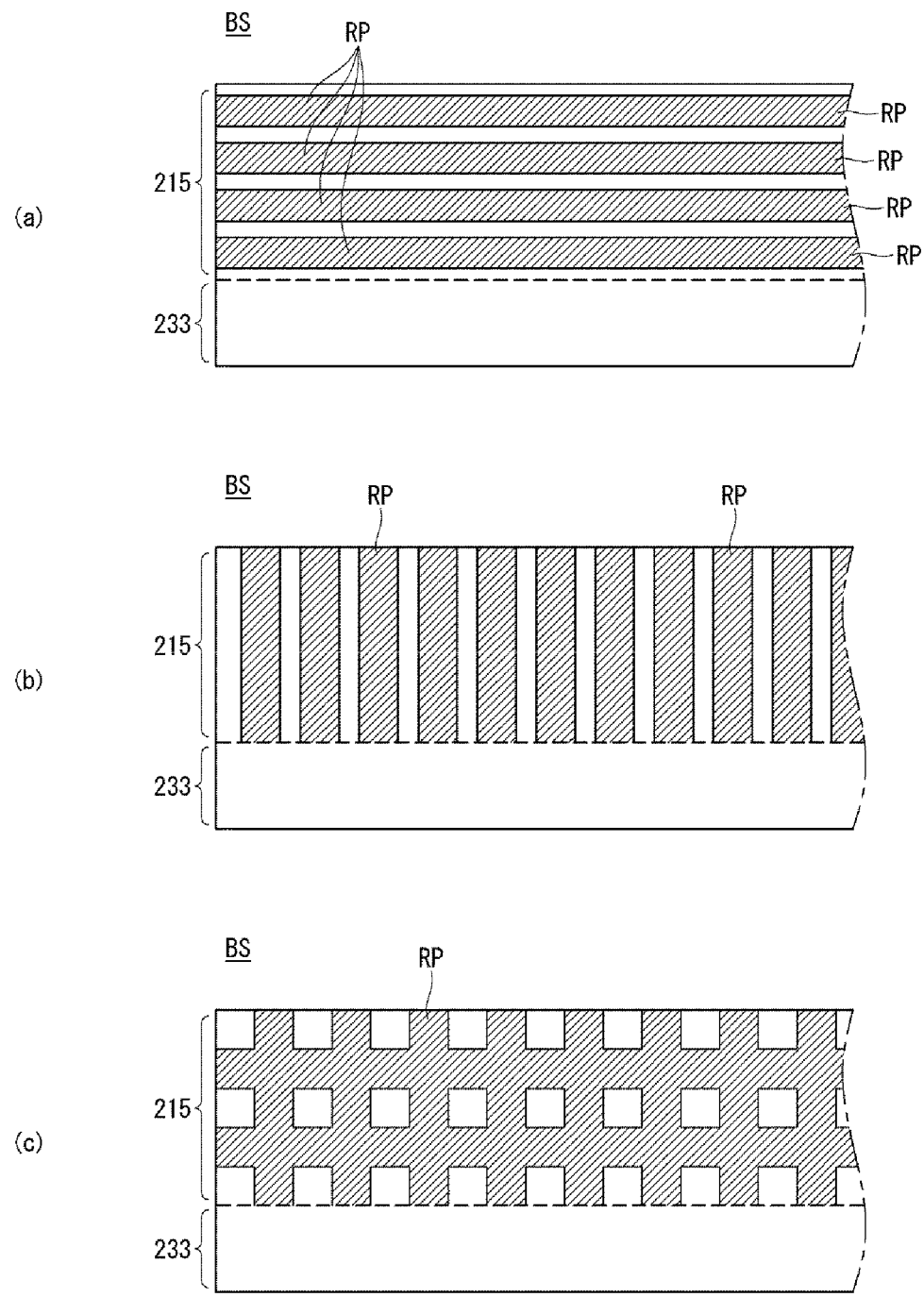

Referring to FIG. 20, the back surface BS of the light guide module 200 may include a scattering pattern RP. The scattering pattern RP may be formed on the first body rear surface 215 of the light guide module 200.

The scattering pattern RP can reflect or scatter light. The scattering pattern RP can disperse or diffuse the light. The scattering pattern RP may have a shape of dots. The scattering pattern RP may include a metallic material. The scattering pattern RP may be printed on the first body rear surface 215.

Referring to FIG. 21(a), the scattering pattern RP may have a stripe shape. The stripes of the scattering pattern RP may have a shape extending in the longitudinal direction of the light guide module 200.

Referring to FIG. 21(b), the scattering pattern RP may have a stripe shape. The stripes of the scattering pattern RP may have a shape extending in the width direction of the light guide module 200. The width direction of the light guide module 200 may a direction from the first body rear surface 215 to the second surface 233.

Referring to FIG. 21(c), the scattering pattern RP may have a lattice shape. If the scattering pattern RP has a lattice shape, the degree of light scattering incident on the back surface BS inside the light guide module 200 can be increased.

Figure 22:
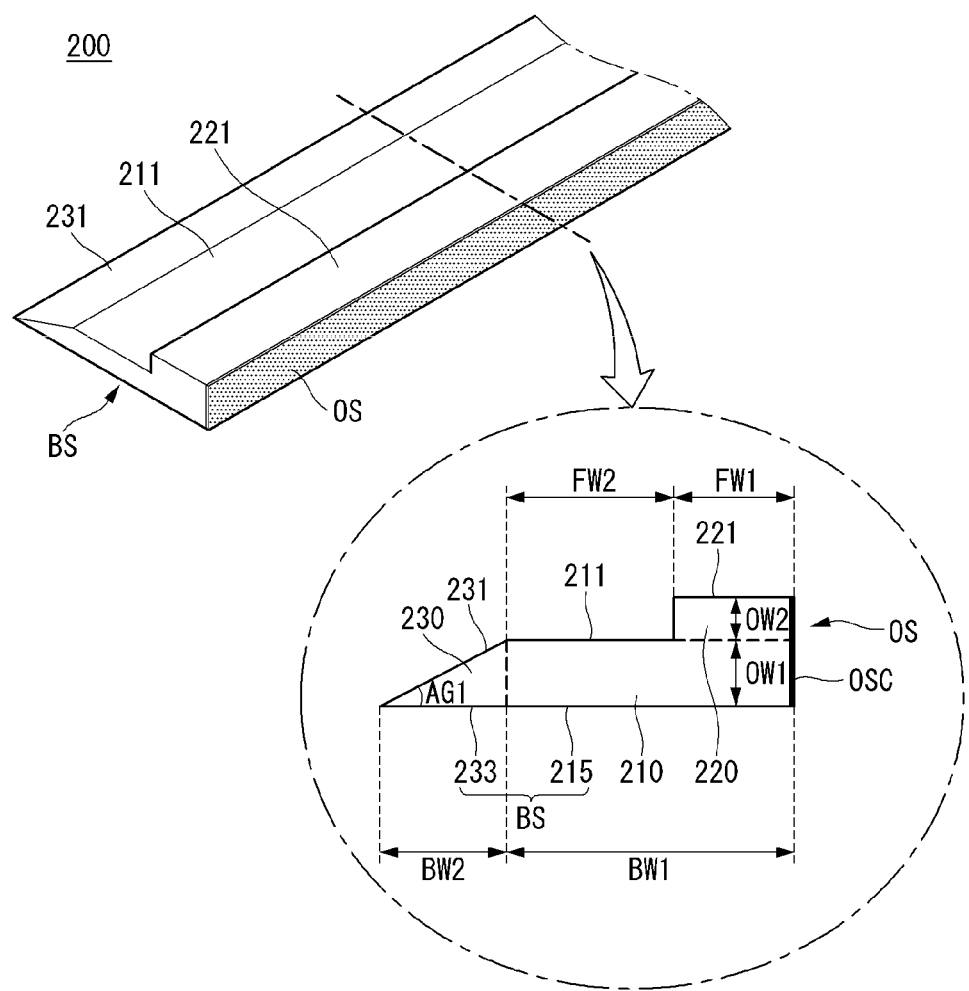

Referring to FIG. 22, a shielding layer OSC may be formed on the outer surface OS of the light guide module 200. The shielding layer OSC may cover the outer surface OS of the light guide module 200. The shielding layer OSC can absorb or reflect light incident onto the shielding layer OSC from the inside of the light guide module 200. For example, the shielding layer OSC can absorb light. The shielding layer OSC may comprise a light absorbing material. For example, the shielding layer OSC may be black.

Figure 23:
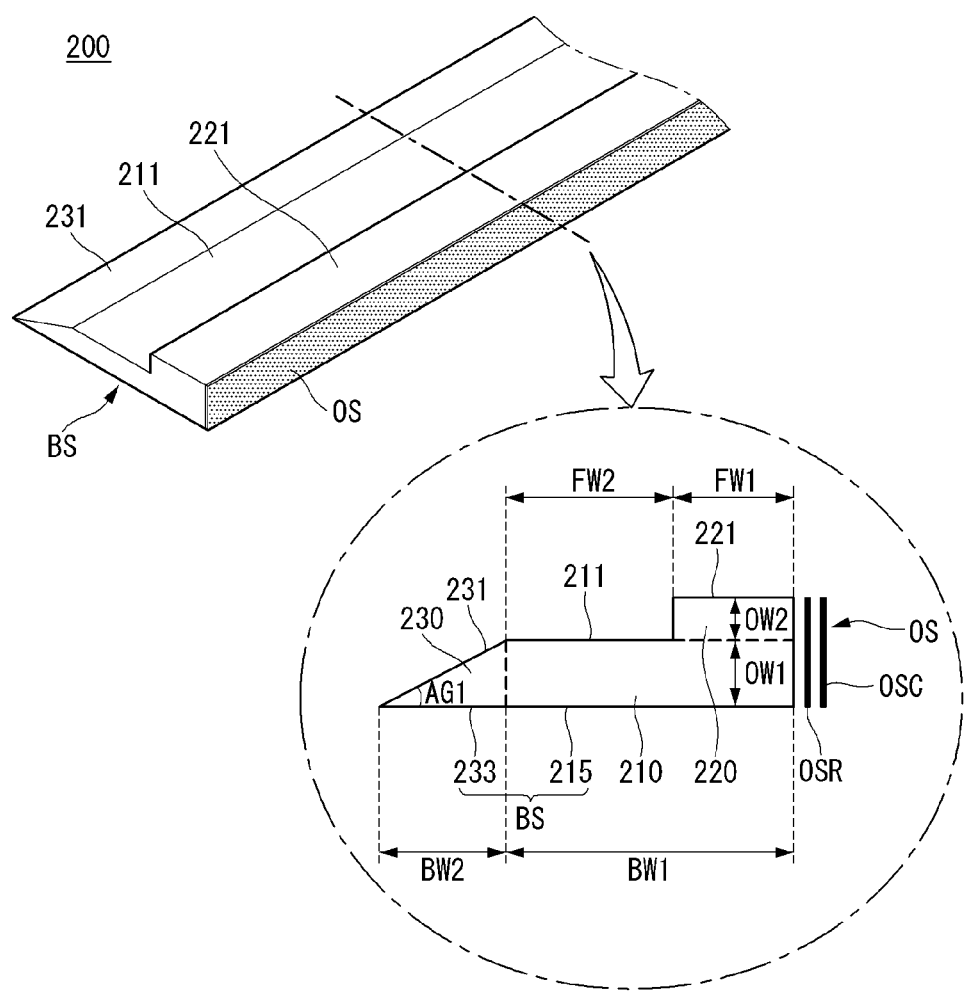

Referring to FIG. 23, a reflective layer OSR may be formed on the outer surface OS of the light guide module 200. The reflective layer OSR and the shielding layer OSC may be laminated on the outer surface OS of the light guide module 200.

The reflective layer OSR may be positioned between the outer surface OS of the light guide module 200 and the shielding layer OSC. The reflective layer OSR may reflect light incident onto the outer surface OS of the light guide module 200 from the inside of the light guide module 200. At least a portion of the light reflected by the reflective layer OSR may be supplied to the display panel 110 (see FIG. 16) through the first body front surface 211. The reflective layer OSR may include a metal. The reflective layer OSR can be printed on the outer side OS of the light guide module 200.

The shielding layer OSC can absorb at least a portion of the light that has passed through the reflective layer OSR. The outer surface OS of the light guide module 200 can be seen black at the outside due to the shielding layer OSC.

Figure 24:
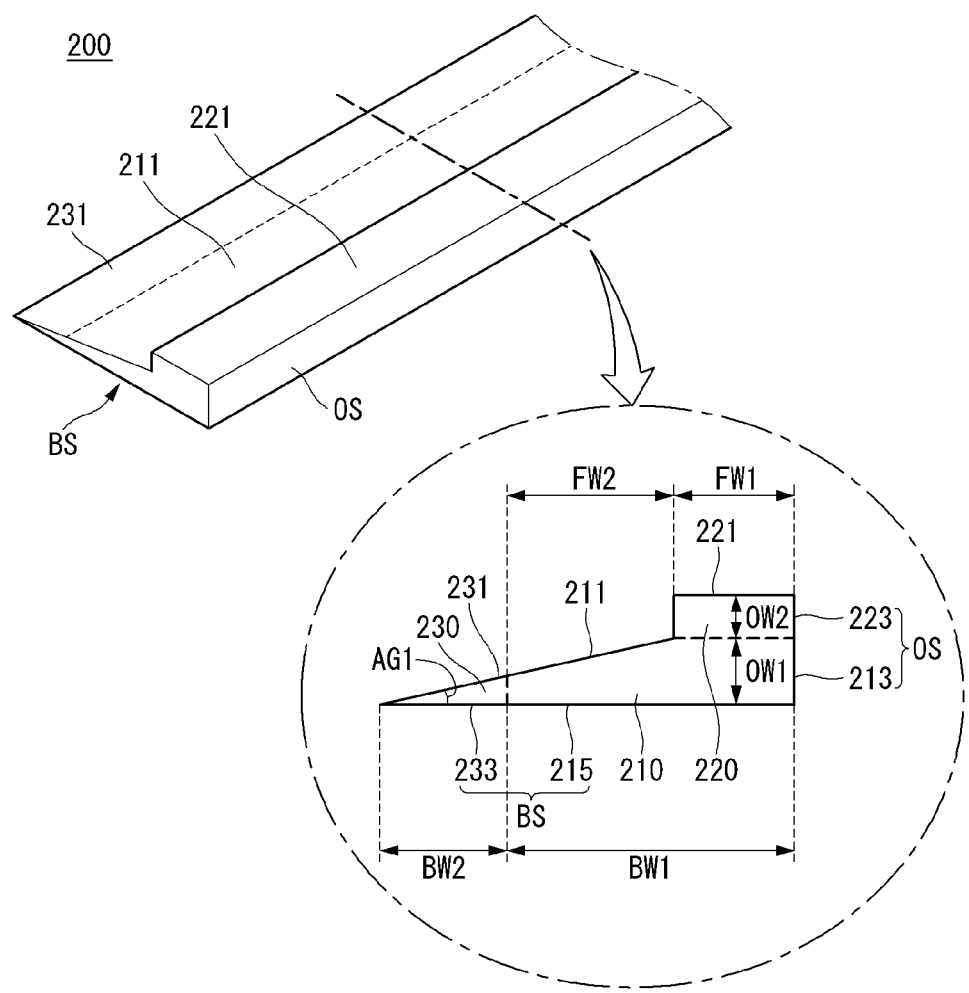

Referring to FIG. 24, the first body rear surface 215 may be alongside of the display panel 110 (see FIG. 16). The first body front surface 211 may be inclined with respect to the first body rear surface 215. The first body front surface 211 may be inclined with respect to the display panel 110 (see FIG. 16). The first body front surface 211 may be inclined in a direction from the second body 220 toward the wing portion 230.

The first surface 231 of the wing portion 230 may extend from the first body front surface 211. The first surface 231 may be located on the same plane as the first body surface 211. The second surface 233 of the wing portion 230 may extend from the first body rear surface 215. The second surface 233 may be located on the same plane as the first body rear surface 215.

The first angle AG1 shown in FIG. 24 may be smaller than the first angle AG1 shown in FIG. 19. The ratio at which the light provided from the backlight unit 120 (see FIG. 16) reaches the extended display area EDA (see FIG. 16) can be higher, as the first angle AG1 is smaller.

Figure 25:
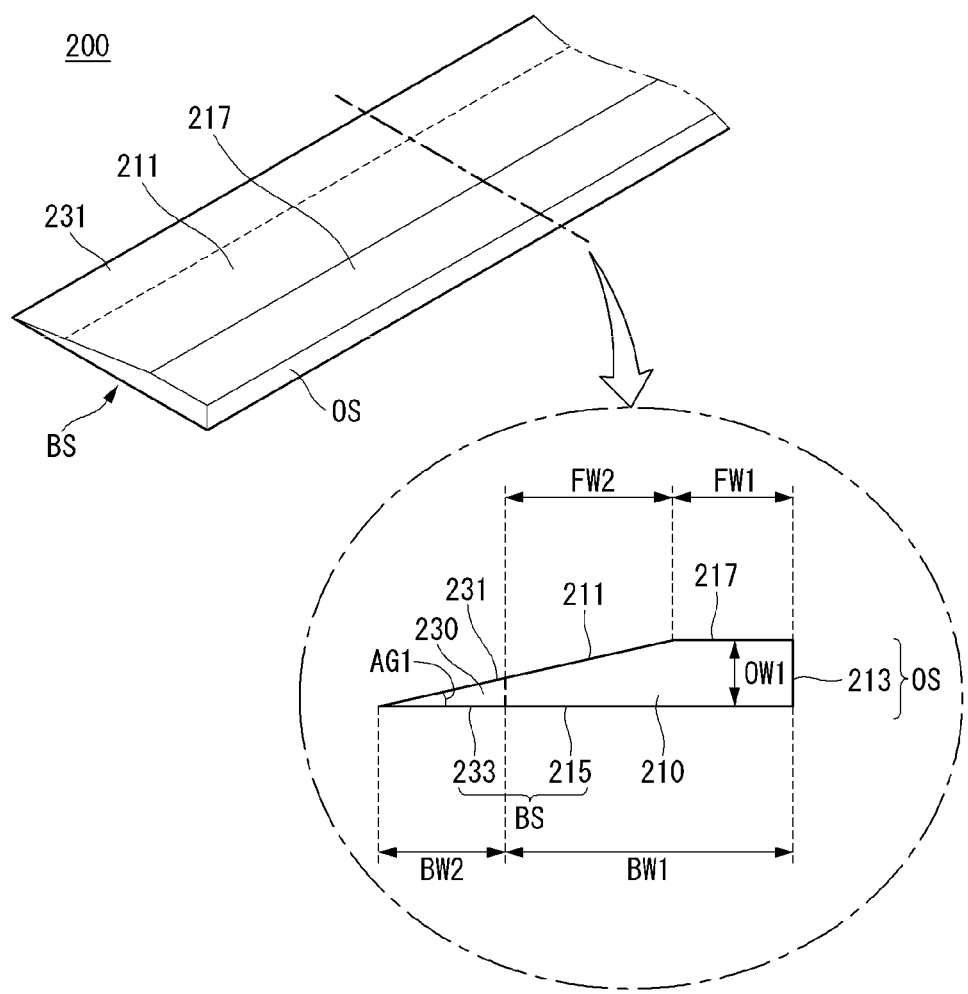

Referring to FIG. 25, the body 210 of the light guide module 200 may include a first body 210. The second front surface 217 of the first body 210 may be extended from the first body front surface 211. The second front surface 217 of the first body 210 may be coupled to the display panel 110 (see FIG. 16). The area of the second front surface 217 may be smaller than the area of the first body rear surface 215.

The second front surface 217 of the first body 210 may be referred to as a second front surface 217 of the body 210. The first body front surface 211 can be referred to as a body front surface 211. The first body rear surface 215 can be referred to as the body rear surface 215.

The body front surface 211 may be connected to the second front surface 217. The first body front surface 211 may be bent and extended from the second front surface 217 toward the rear of the body 210.

The thickness of the light guide module 200 may be the first outer thickness OW1. Since the body 210 of the light guide module 200 does not include the second body 220 (FIG. 24), the thickness of the light guide module 200 may be relatively small.

As the first body 210 is directly coupled to the display panel 110 (see FIG. 16) and the light guide module 200 is relatively thin, the light guide module 200 can couple the display panel 110 (see FIG. 16) with the side frame 140 (see FIG. 16) more strongly.

Figure 26:
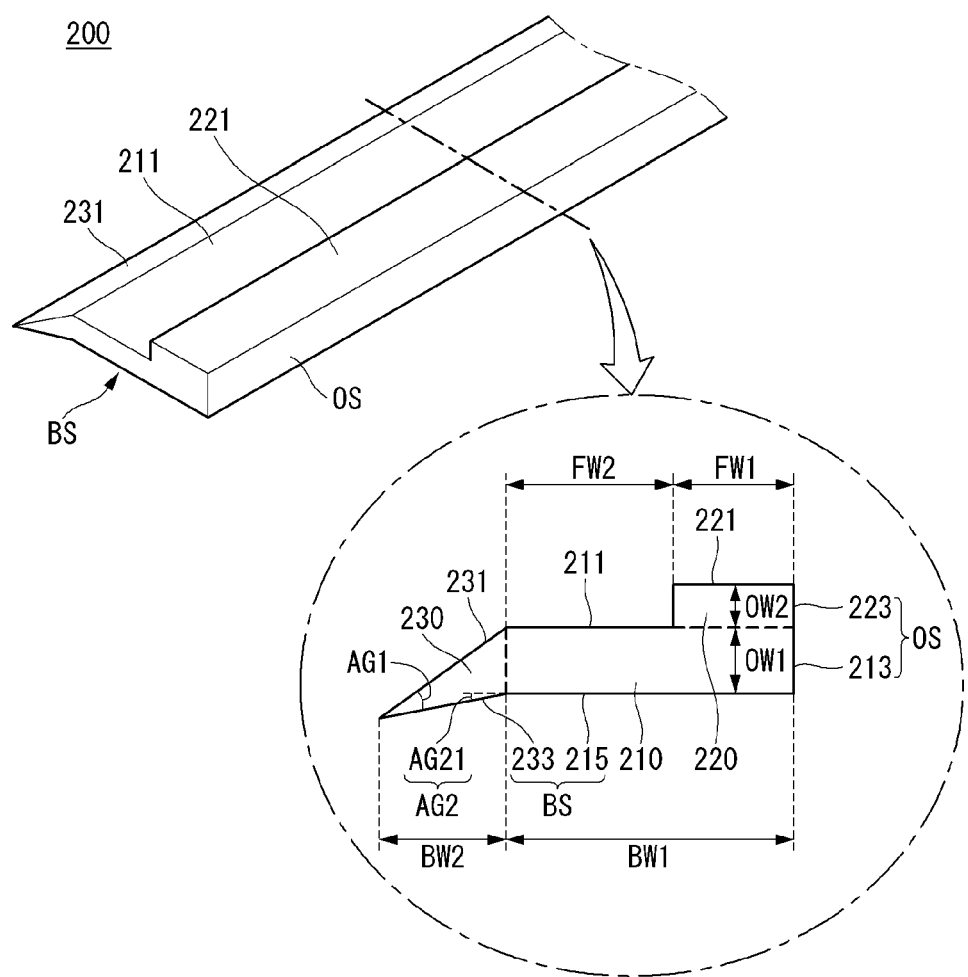

Referring to FIG. 26, the light guide module 200 may include a first body 210, a second body 220, and a third body 230. The second body 220 may extend from the first body 210 toward the front of the first body 210. The wing portion 230 may extend from the first body 210.

The second surface 233 of the wing portion 230 may be bent and extended toward the rear of the first body 210 from the first body rear surface 215. The angle at which the second surface 233 is bent from the first body rear surface 215 may be referred to as a second rear angle AG21. The second rear angle AG21 can be referred to as a second angle AG2.

As the second rear angle AG21 is formed, the angle formed by the first surface 231 and the display panel 110 (see FIG. 16) can be greater. The greater the angle formed by the first surface 231 and the display panel 110 (see FIG. 16), the greater the amount of light provided to the extended display area EDA (see FIG. 16) may be.

Figure 27:
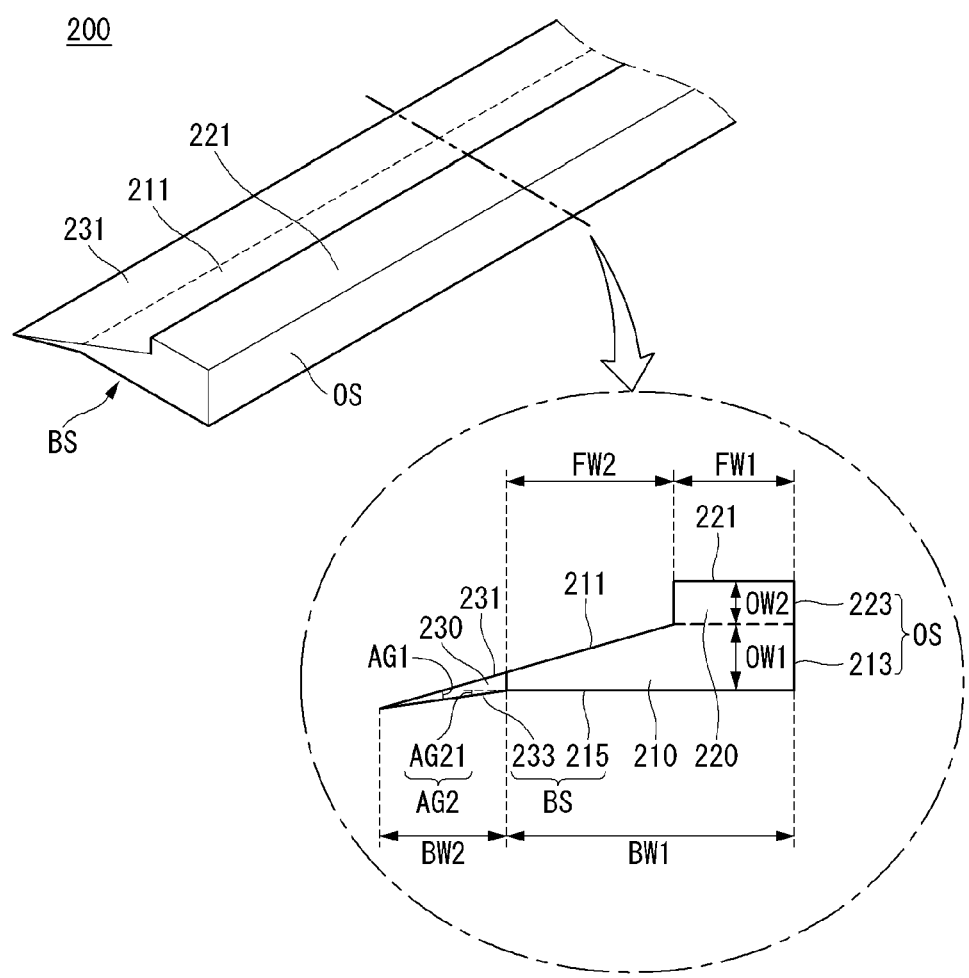

Referring to FIG. 27, the light guide module 200 may include a first body 210, a second body 220, and a wing portion 230. The first body front surface 211 may be located on the same plane as the first surface 231.

The second surface 233 may be bent and extended toward the rear of the first body 210 from the first body rear surface 215. The rear width of the wing portion 230 may be the second back width BW2. The second back width BW2 shown in FIG. 27 may be greater than the back width BW2 shown in FIG. 26.

The second surface 233 can have a relatively large area due to the structure of the wing portion 230. As the second surface 233 is widened, light incident into the first body 210 can be increased. As more light enters into the first body 210, the light provided to the extended display area EDA (see FIG. 16) may be relatively increased.

Figure 28:
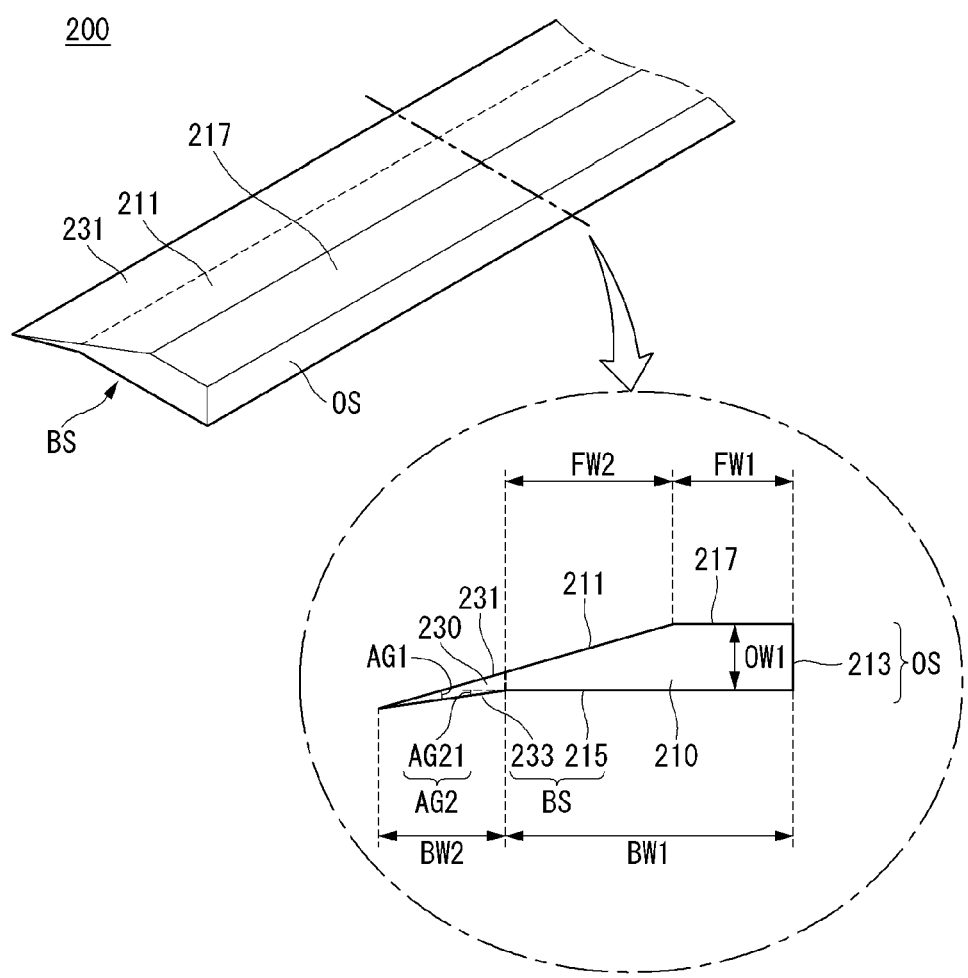

Referring to FIG. 28, the light guide module 200 may include a first body 210 and a wing portion 230. The first body 210 may include a second front surface 217. The second front surface 217 can be coupled to the display panel 110 (see FIG. 16).

The second surface 233 of the wing portion 230 may be bent as much as a second rear angle AG21 and extended from the first body rear surface 215 toward the rear of the first body 210. The first body front surface 211 and the first surface 231 may be inclined with respect to the display panel 110 (see FIG. 16).

The second surface 233 can have a relatively large area due to the structure of the wing portion 230. The light guide module 200 can provide the extended display area EDA (see FIG. 16) with relatively large amount of light. The light guide module 200 can supply relatively high bonding force (or rigidity) to the display panel 110 (see FIG. 16) and the side frame 140 (see FIG. 16), due to the structure of the body 210 of the light guide module 200.

Figure 29:
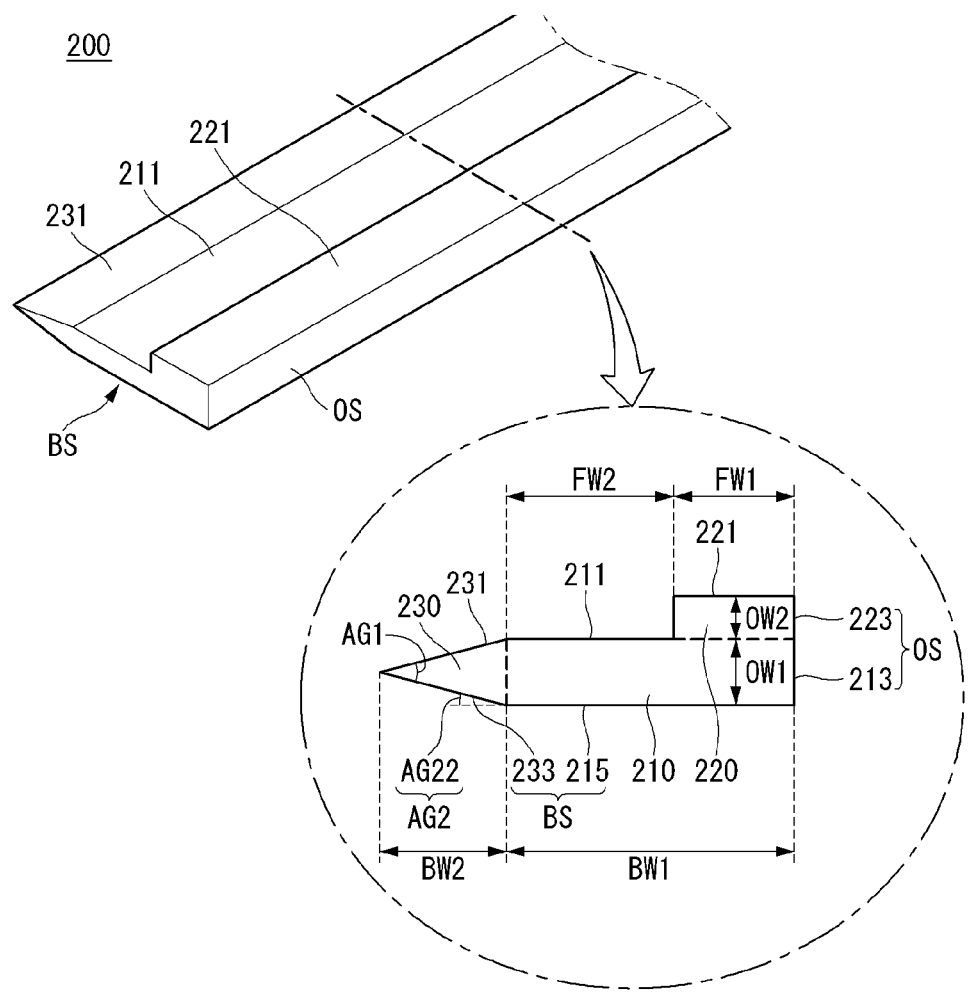

Referring to FIG. 29, the light guide module 200 may include a first body 210, a second body 220, and a wing portion 230. The second surface 233 of the wing portion 230 may be bent and extended by a second front angle AG22 toward the front of the first body 210 at the first body rear surface 215. The second front angle AG22 can be referred to as a second angle AG2.

The first surface 231 of the wing portion 230 may extend from the first body surface 211. The first surface 231 of the wing portion 230 can be bent and extended from the first body surface 211 toward the rear of the first body 210.

Owing to the structure of the wing portion 230, the light provided from the backlight unit 120 (see FIG. 16) at a far position from the light guide module, can be relatively easily incident onto the second surface 233.

Due to the structure of the wing portion 230, the second back width BW2 of the wing portion 230 may be relatively small. As the second back width BW2 is smaller, the amount of light blocked by the wing 230 can be reduced.

Figure 30:
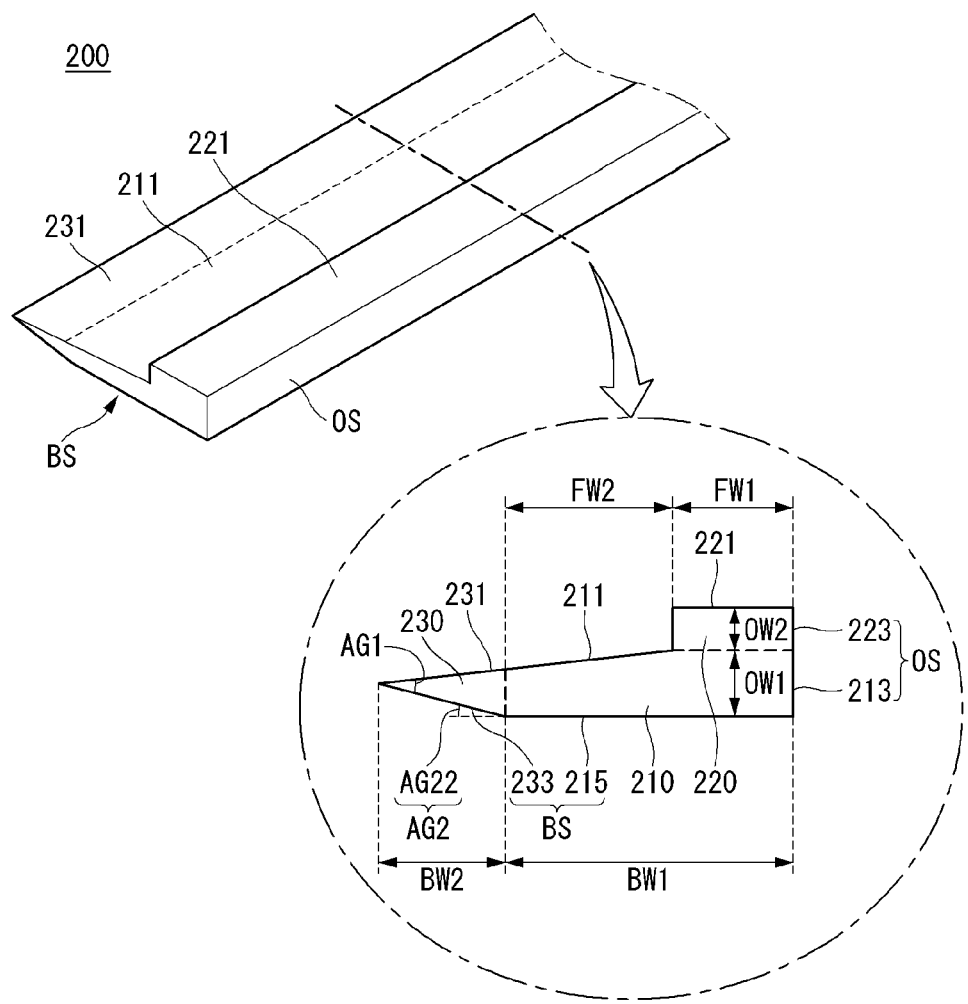

Referring to FIG. 30, the light guide module 200 may include a first body 210, a second body 220, and a wing portion 230.

The first body front surface 211 may be located on the same plane as the first surface 231. Among the light reaching the extended display area EDA (see FIG. 16), the proportion of light directly reaching the extended display area EDA from the backlight unit 120 (see FIG. 16) may be relatively high.

The second surface 233 may be bent and extended toward the front of the first body 210 from the first body rear surface 215. The second surface 233 can face a relatively high proportion of the area of the backlight unit 120 (see FIG. 16).

Figure 31:
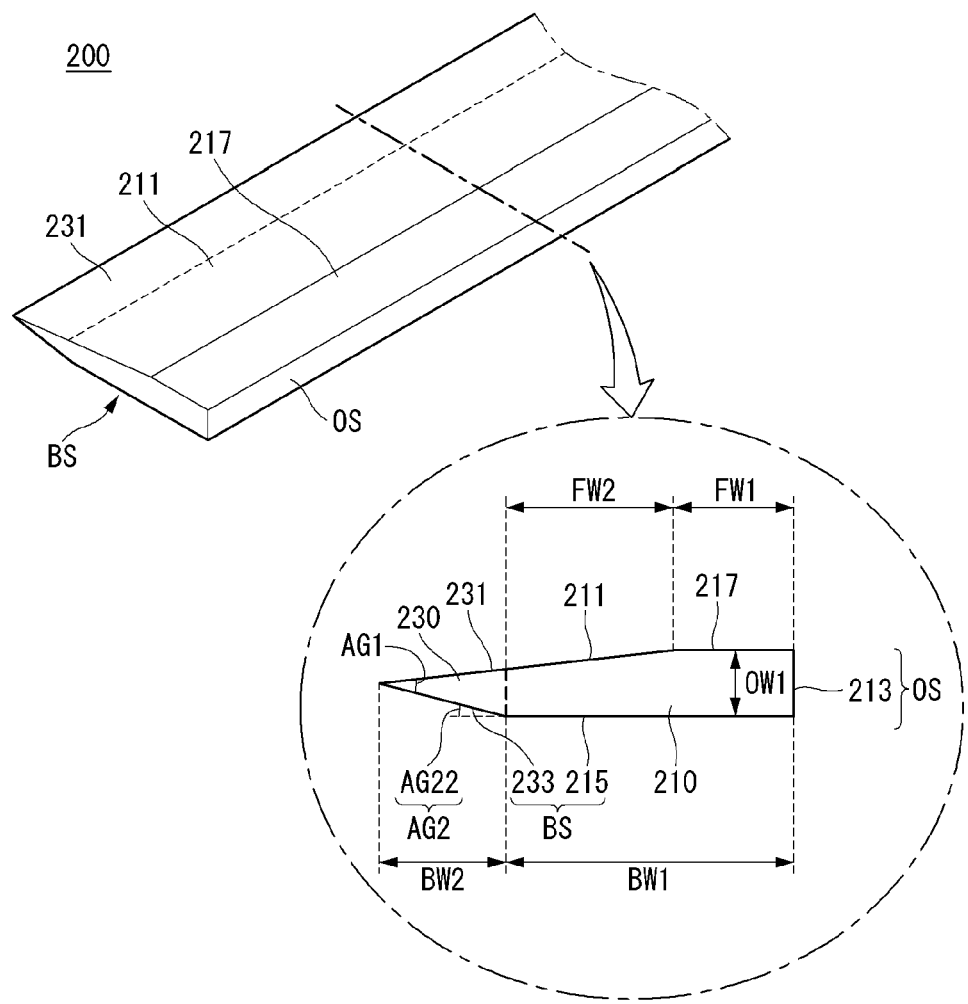

Referring to FIG. 31, the light guide module 200 may include a first body 210 and a wing portion 230. The second front surface 217 of the first body 210 may be coupled to the display panel 110 (see FIG. 16).

The optical property of the light guide module 200 shown in FIG. 31 may be analogous to the optical property of the light guide module 200 shown in FIG. 30.

The first body 210 of the light guide module 200 may be directly coupled to the display panel 110 (see FIG. 16), so that the bonding force between the display panel 110 (see FIG. 16) and the side frame 140 can be improved.

Figure 32:
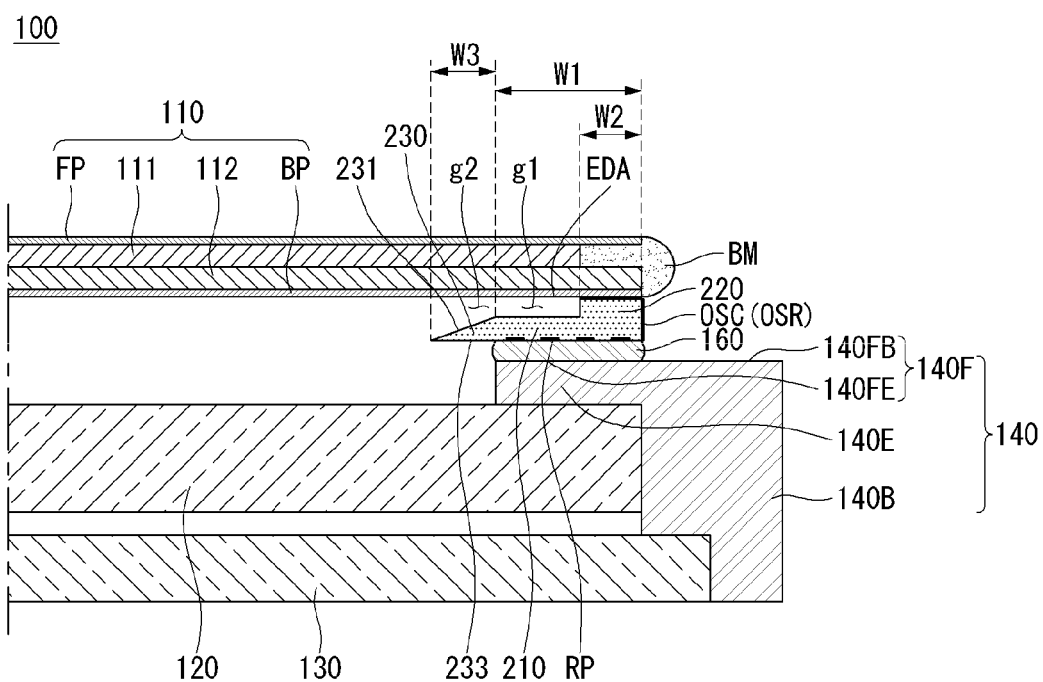
FIG. 32 is a cross-sectional view of display device including the light guide module according to an embodiment of the present invention.

FIG. 32 is a cross-sectional view of a display device including a light guide module according to an embodiment of the present invention. The light guide module 200 may include a first body 210, a second body 220, and a wing portion 230.

The adhesive member 160 may be positioned between the first body 210 and the side frame extension 140E. The adhesive member 160 can couple the first body 210 with the side frame 140.

The second body 220 may extend from the front surface of the first body 210 toward the front of the first body 210. The second body 220 may be coupled to the display panel 110 by UV bonding.

Gaps g1 and g2 may be formed between the light guide module 200 and the display panel 110. The gap g1 or g2 may include a first gap g1 and a second gap g2. The first gap g1 can communicate with the second gap g2. The first gap g1 may be located between the first body 210 and the display panel 210. The first gap g1 may be located between the first body 210 and the extended display area EDA. The second gap g2 may be located between the wing portion 230 and the display panel 110. The gaps g1 and g2 may be paths of light provided directly from the backlight unit 120 to the extended display area EDA.

The wing portion 230 may receive light from the backlight unit 120 and provide at least a portion of the light to the first body 210. The second surface 233 of the wing portion 230 can receive light from the backlight unit 120. A portion of the light incident onto the second surface 233 of the wing portion 230 can be refracted at the second surface 233 and reach the first body 210. Another portion of the light incident onto the second surface 233 of the wing portion 230 may be refracted at the second surface 233 to reach the first surface 231 of the wing portion 230. At least a portion of the light traveling inside the wing portion 230 and reaching the first surface 231 may proceed toward the first body 210. Another portion of the light traveling in the wing portion 230 and reaching the first surface 231 may pass through the first surface 231 and proceed through the second gap g2.

A portion of the light reaching the inside of the first body 210 may pass outside the first body 210 and pass through the first gap g1. Another portion of the light reaching the inside of the first body 210 may be reflected, refracted, scattered or dispersed by the scattering pattern RP and travel toward the first gap g1. The scattering pattern RP may be formed on the rear surface of the first body 210.

The reflective layer OSR may be formed on the outer surface of the light guide module 200. The reflective layer OSR may reflect a part of the light traveling in the interior of the first body 210 or the interior of the second body 220. The shielding layer OSC may be formed on the outer surface of the light guide module 200. The shielding layer OSC may include a light absorbing material. The shielding layer OSC can absorb light. The reflective layer OSR and the covering layer OSC may be sequentially stacked on the outer surface of the light guide module 200.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a frame;
a display panel;
a backlight unit coupled to the frame and positioned at a rear of the display panel, wherein the backlight unit is configured to provide the display panel with light;
a side frame coupled to the frame; and
a light guide module positioned between the display panel and the side frame and comprising an outer side surface positioned to face an exterior of the display device and a shielding layer covering the outer side surface,
wherein the light guide module extends along the side frame and a gap is defined between a portion of the light guide module and the display panel.

2. The display device of claim 1, wherein the side frame comprises a side frame body and a side frame extension extending from the side frame body.

3. The display device of claim 2, wherein the light guide module comprises a first light guide body coupled to the side frame extension and comprising a first front surface and a second light guide body extending in a forward direction from the first light guide body and comprising a second front surface coupled to the display panel; and
wherein a part of the gap is defined between the first front surface and the display panel.

4. The display device of claim 3, wherein:
the light guide module further comprises a wing portion extending in an inward direction from the first light guide body toward a center region of the display device; and
at least a portion of the wing portion narrows in the inward direction.

5. The display device of claim 4, wherein the wing portion comprises:
an incident surface facing the backlight unit and positioned to be exposed to the light provided by the backlight unit; and a guide surface facing the display panel and angled with respect to the incident surface and the display panel.

6. The display device of claim 5, wherein:
the first light guide body comprises a body rear surface adjacent to the incident surface and positioned to face the side frame extension; and
the first front surface of the light guide module is adjacent to the guide surface and is positioned to face the display panel.

7. The display device of claim 6, wherein the guide surface is angled with respect to the first front surface of the light guide module in a direction toward the backlight unit from the first front surface.

8. The display device of claim 6, wherein the first front surface of the light guide module is angled with respect to the display panel in a direction toward the wing portion from the second front surface.

9. The display device of claim 6, wherein the incident surface is angled with respect to the body rear surface in a direction toward the backlight unit.

10. The display device of claim 6, wherein the incident surface is angled with respect to the body rear surface in a direction toward the display panel.

11. The display device of claim 2, wherein the light guide module comprises:
a light guide body comprising:
a rear surface coupled to the side frame extension;
a coupled front surface coupled to the display panel; and
a wing portion extending in an inward direction from the light guide body toward a center region of the display device,
wherein the wing portion narrows in the inward direction.

12. The display device of claim 11, wherein:
the light guide body comprises an uncoupled front surface angled with respect to the coupled front surface and extending from the coupled front surface toward the wing portion; and
a part of the gap is defined between the uncoupled front surface and the display panel.

13. The display device of claim 12, wherein the incident surface is angled with respect to the rear surface toward the display panel.

14. The display device of claim 11, wherein the wing portion comprises:
a guide surface extending from the uncoupled front surface and angled with respect to the display panel; and
an incident surface extending from the rear surface and positioned to be exposed to light provided by the backlight unit.

15. The display device of claim 14, wherein the incident surface is angled with respect to the rear surface toward the backlight unit.

16. The display device of claim 1, wherein the light guide module comprises:
a rear surface positioned to face the side frame extension; and
a scattering pattern disposed at the rear surface and configured to disperse the light provided by the backlight unit.

17. The display device of claim 1, wherein the light guide module comprises:
a reflective layer disposed between the outer side surface and the shielding layer and configured to reflect the light provided by the backlight unit.

18. The display device of claim 1, wherein:
the frame comprises a first frame side edge and a second frame side edge opposite the first frame side edge;
the side frame comprises a first side frame covering the first frame side edge and a second side frame covering the second frame side edge; and
the light guide module comprises:
a first light guide module positioned between the first side frame and the display panel; and
a second light guide module positioned between the second side frame and the display panel.

19. The display device of claim 18, wherein:
the frame further comprises a third frame side edge extending between the first frame side edge and the second frame side edge;
the side frame further comprises a third side frame covering the third frame side edge; and
the light guide module further comprises a third light guide module positioned between the third side frame and the display panel.

20. The display device of claim 1, further comprising an adhesive pad coupling the light guide module and the side frame extension.

21. The display device of claim 1, wherein the display panel is coupled to the light guide module through UV bonding.

* * * * *